United States Patent
Kang et al.

(10) Patent No.: US 6,762,543 B1
(45) Date of Patent: Jul. 13, 2004

(54) DIAMOND DIODE DEVICES WITH A DIAMOND MICROTIP EMITTER

(75) Inventors: Weng Poo Kang, Nashville, TN (US); Jimmy Lee Davidson, Brentwood, TN (US); David V. Kerns, Jr., Nashville, TN (US)

(73) Assignee: Vanderbilt University, Nashville, TN (US)

( * ) Notice: Subject to any disclaimer, the term of this patent is extended or adjusted under 35 U.S.C. 154(b) by 102 days.

(21) Appl. No.: 09/617,351

(22) Filed: Jul. 17, 2000

Related U.S. Application Data

(62) Division of application No. 08/883,417, filed on Jun. 25, 1997, now Pat. No. 6,132,278.
(60) Provisional application No. 60/020,428, filed on Jun. 25, 1996.

(51) Int. Cl.[7] .............................. H01J 1/30; H01J 1/304; H01J 19/24; H01J 19/02
(52) U.S. Cl. .................. 313/311; 313/309; 313/346 R; 313/351; 313/336
(58) Field of Search ................................. 313/309, 310, 313/311, 351, 346 R, 336, 326; 445/51

(56) References Cited

U.S. PATENT DOCUMENTS

| | | |
|---|---|---|
| 4,164,680 A | 8/1979 | Villanlobos |
| 4,307,507 A | 12/1981 | Gray et al. |
| 4,851,254 A | 7/1989 | Yamamoto et al. |
| 4,964,946 A | 10/1990 | Gray et al. |
| 5,038,070 A | 8/1991 | Bardai et al. |
| 5,126,287 A | 6/1992 | Jones |
| 5,129,850 A | 7/1992 | Kane et al. |
| 5,138,237 A | 8/1992 | Kane et al. |
| 5,180,951 A | 1/1993 | Dworsky |
| 5,199,918 A * | 4/1993 | Kumar ........................ 445/50 |
| 5,202,571 A | 4/1993 | Hirabayashi et al. |
| 5,221,221 A | 6/1993 | Okaniwa |
| 5,249,340 A | 10/1993 | Kane et al. |
| 5,270,258 A | 12/1993 | Yoshida |
| 5,278,475 A * | 1/1994 | Jaskie et al. ................. 313/311 |
| 5,283,501 A | 2/1994 | Zhu et al. |
| 5,289,086 A | 2/1994 | Kane |
| 5,345,141 A | 9/1994 | Moyer |
| 5,354,714 A | 10/1994 | Boysel |

(List continued on next page.)

OTHER PUBLICATIONS

"Micropatterned Polycrystalline Diamond Field Emitter Vacuum Diode Arrays", *J. Vac. Sci. Technol*, B. 14(3), May/Jun. 1996, by W. P. Kang, et al.

"A Novel Low Field Electron Emission Polycrystalline Diamond Microtip Arrays for Sensor", *Transducers '95— Eurosensors IX* by W. P. Kang, et al.

Extreme Devices, Inc., Advanced Microelectronic Technologies, Triode Devices, Oct. 2, 2000, 5 pages, Webpages printed from Internet, Austin, TX, USA.

Marla Dial, RSD Firm Spawns Electron Gun Spinout, Austin Business Journal, Aug. 21, 1998, 3 pages, Austin, TX, USA.

*Primary Examiner*—Nimeshkumar D. Patel
*Assistant Examiner*—Mariceli Santiago
(74) *Attorney, Agent, or Firm*—Waddey & Patterson; Mark J. Patterson

(57) ABSTRACT

Diamond microtip field emitters are used in diode and triode vacuum microelectronic devices, sensors and displays. Diamond diode and triode devices having integral anode and grid structures can be fabricated. Ultra-sharp tips are formed on the emitters in a fabrication process in which diamond is deposited into mold cavities in a two-step deposition sequence. During deposition of the diamond, the carbon graphite content is carefully controlled to enhance emission performance. The tips or the emitters are treated by post-fabrication processes to further enhance performance.

7 Claims, 35 Drawing Sheets

U.S. PATENT DOCUMENTS

| | | | |
|---|---|---|---|
| 5,399,238 A | * 3/1995 | Kumar | 445/51 |
| 5,438,343 A | 8/1995 | Khan et al. | |
| 5,439,753 A | 8/1995 | Rogers | |
| 5,449,435 A | * 9/1995 | Ageno et al. | 313/309 |
| 5,499,938 A | 3/1996 | Nakamoto et al. | |
| 5,552,613 A | * 9/1996 | Nishibayashi et al. | 313/309 |
| 5,580,827 A | 12/1996 | Akamine | |
| 5,602,439 A | 2/1997 | Valone | |
| 5,679,895 A | * 10/1997 | von Windheim | 313/336 |
| 5,757,344 A | * 5/1998 | Miyata et al. | 313/311 |
| 5,836,796 A | * 11/1998 | Danroc | 313/309 |
| 5,959,400 A | * 9/1999 | Niigaki et al. | 313/336 |
| 6,184,611 B1 | * 2/2001 | Saito et al. | 313/309 |

* cited by examiner 896011 25KV X11.0K 2.7um

DIAMOND DIODE DEVICES WITH A DIAMOND MICROTIP EMITTER

This application is a divisional of and claims benefit to U.S. patent application Ser. No. 08/883,417 filed Jun. 25, 1997 now U.S. Pat. No. 6,132,278, entitled "Mold Method for Forming Vacuum Field Emitters and Method for Forming Diamond Emitters." This application claims benefit of PROVISIONAL APPLICATION No. 60/020,428, filed Jun. 25, 1996.

BACKGROUND OF THE INVENTION

The present invention relates to vacuum microelectronics and particularly to micro-patterned, microtip emitter structures made from diamond and similar materials, such as field emitter elements/arrays for use as vacuum diodes, triodes, sensors, displays, and other related applications.

The advance in integrated circuit fabrication and silicon micromachining technology has given an impetus to the development of vacuum microelectronic devices. Central to the field of vacuum microelectronics is the search for a high efficiency electron emission cathode. In recent years, many different materials, structures, and techniques have been investigated for fabrication of vacuum cold cathode devices. Examples of such materials, structures, and techniques are described in: H. F. Gray, Proc. 29th Intl. Field Emission Symp., p. 111, 1982; I. Brodie, IEEE Trans. on Electron Devices, 36, p. 2641, 1989; C. A Spindt, C. E. Holland, A. Rosengreen and I. Brodie, IEEE Trans. on Electron Devices, 38, p. 2355, 1991; E. A Adler, Z. Bardai, R. Forman, D. M. Goebel, R. T. Longo and M. Sokolich, IEEE Trans. on Electron Devices, 38, p. 2304, 1991; and M. Yuan, Q. Li, W. P. Kang, S. Tang and J. F. Xu, Journal of Vacuum Science Technology B, 12(2), p. 676–679, 1994. The most desirable properties for an electron emission cathode are low operating voltage, high emission current density and uniformity, and emission stability, longevity and reliability.

The unique material properties of diamond, including low electron affinity, wide band-gap, chemical stability, resistance to particle bombardment, hardness, and good thermal conductivity, are beneficial for vacuum microelectronics applications. However, due to the chemical inertness of diamond, the work reported in the prior art involves only planar diamond films, non-uniformly diamond coated silicon tips, or irregular ion-etched diamond conical structures. Control of the uniformity and microstructure of diamond film is essential for field emission device applications. Very high field emission current with diamond is achieved by proper design and configuration of a well structured diamond microtip emitter.

Although those skilled in the art have recognized that diamond has properties that make it potentially very useful as an emitter in microelectronic devices, that potential has remained unfulfilled up to now. Various emitter structures using diamond have been designed but their emission performance has been unsatisfactory. For example, many prior art diamond tipped emitter structures have been inefficient emitters or have produced emission currents that are unstable. To obtain high field emission efficiency in a solid state microstructure emitter, the tip of the emitter must be extremely sharp. In those few instances in the prior art where efficient and stable diamond tip emitters have been built, the fabrication techniques have been expensive and/or time consuming. Typically, the prior art to structures have been fabricated by a sputtering or deposition process that lays the diamond on a planar substrate. The resulting emitter structure must then go through extensive machining or other post-deposition shaping steps in an attempt to create a sharp tip that will perform adequately. In other prior art fabrication methods, additional steps must be taken to initiate diamond growth, such as by ion implantation of the substrate. For example, in U.S. Pat. No. 5,129,850, the inventors describe a method of fabricating an emitter having a diamond coating. Although the diamond coating may enhance the emission characteristics of the emitter (assuming that the device could actually be built as described), the device will not have the same desirable characteristics found in a solid, monolithic diamond emitter structure.

SUMMARY OF THE INVENTION

The fabrication and emission performance problems of the prior art have been overcome in the novel field emission devices and fabrication methods of this invention, using sharp tips of well patterned diamond microtip emitters (e.g., pyramid, knife edge, conical, volcanic cone, sharp pillar microstructures) for the development of vacuum field emitter element/arrays for vacuum microelectronics and sensor applications. The use of local electric field enhancement at sharp points, constructed by molding and micromachining techniques of diamond material as described here, utilizes plasma enhanced chemical vapor deposition (PECVD) to produce micron size or smaller structures, on a diamond film/field, with very sharp tip curvatures, such as less than 200 A. Several novel structures and devices are described, including a micro-patterned diamond emitter element/array, and related novel device structures in diode, triode, display, and sensor configurations.

To create the high performance diamond microtip structures of this invention, several novel fabrication steps are described, including deposition of diamond into cavities formed in a substrate mold, using a novel deposition process that preferably occurs in a sequence of smooth and standard deposition steps. In the smooth deposition step, small grain sizes are achieved at the tip of the emitter structure, with the standard deposition step producing larger grain sizes with an increased deposition rate.

The novel fabrication processes of this invention includes the ability to control the carbon graphite content of the diamond. This produces a diamond tip with an ideal or controllable balance of emission efficiency and durability. Emission performance of the structure is further enhanced by vacuum-thermal-electric treatment of the tips, hydrogen plasma tip sharpening, high temperature annealing, and application of thin metal coatings to the tips.

In another embodiment of the invention, diamond microtip emitters and emitter arrays are used as cathodes in novel diode and triode devices having integrated anode and/or grid structures.

High current emission from the patterned diamond microtip arrays was obtained at low electric fields. An emission current from the diamond microtips of 0.1 mA was observed for a field of <10 V/$\mu$m. Field emission for these diamond microtips exhibits significant enhancement in total emission current compared to silicon emitters. Moreover, field emission from patterned pyramidal polycrystalline diamond microtip emitter arrays, as fabricated by the inventors and described herein, is unique in that the applied field is found to be lower compared to that required for emission from Si, Ge, GaAs, and metal surfaces. The novel fabrication processes utilize selective deposition of diamond film in a cavity mold such as might be created in silicon, and subsequent creation of a free standing diamond substrate or plate with a diamond microtip emitter array. The processing techniques are compatible with IC and other micromachining fabrication technologies.

BRIEF DESCRIPTION OF THE DRAWINGS

FIG. 2b is a perspective view of an array of diamond microtip pyramidal emitter structures fabricated using the molding substrate of FIG. 2a.

FIG. 3b is a perspective view of an array of diamond microtip pyramidal emitters with silicon dioxide as a dielectric layer in a gated diode structure, fabricated using the molding substrate of FIG. 3a.

FIG. 4b is a perspective view of an array of diamond microtip high aspect ratio, pillar-type emitter structures, fabricated using the molding substrate of FIG. 4a.

FIG. 5b is a perspective view of an array of diamond microtip knife-edge emitter structures fabricated using the molding substrate of FIG. 5a.

FIG. 6b is a perspective view of an array of diamond microtip high aspect ratio, knife-edge emitters, fabricated using the molding substrate of FIG. 6a.

FIG. 7b is a perspective view of an array of diamond microtip emitter cylindrical structures, fabricated using the molding substrate of FIG. 7a.

FIG. 8b is a perspective view of an array of diamond microtip conical emitter structures, fabricated using the molding substrate of FIG. 8a.

DESCRIPTION OF THE PREFERRED EMBODIMENTS

Fabrication of Diamond Microtips Using Substrate Molding

Figure 1A:
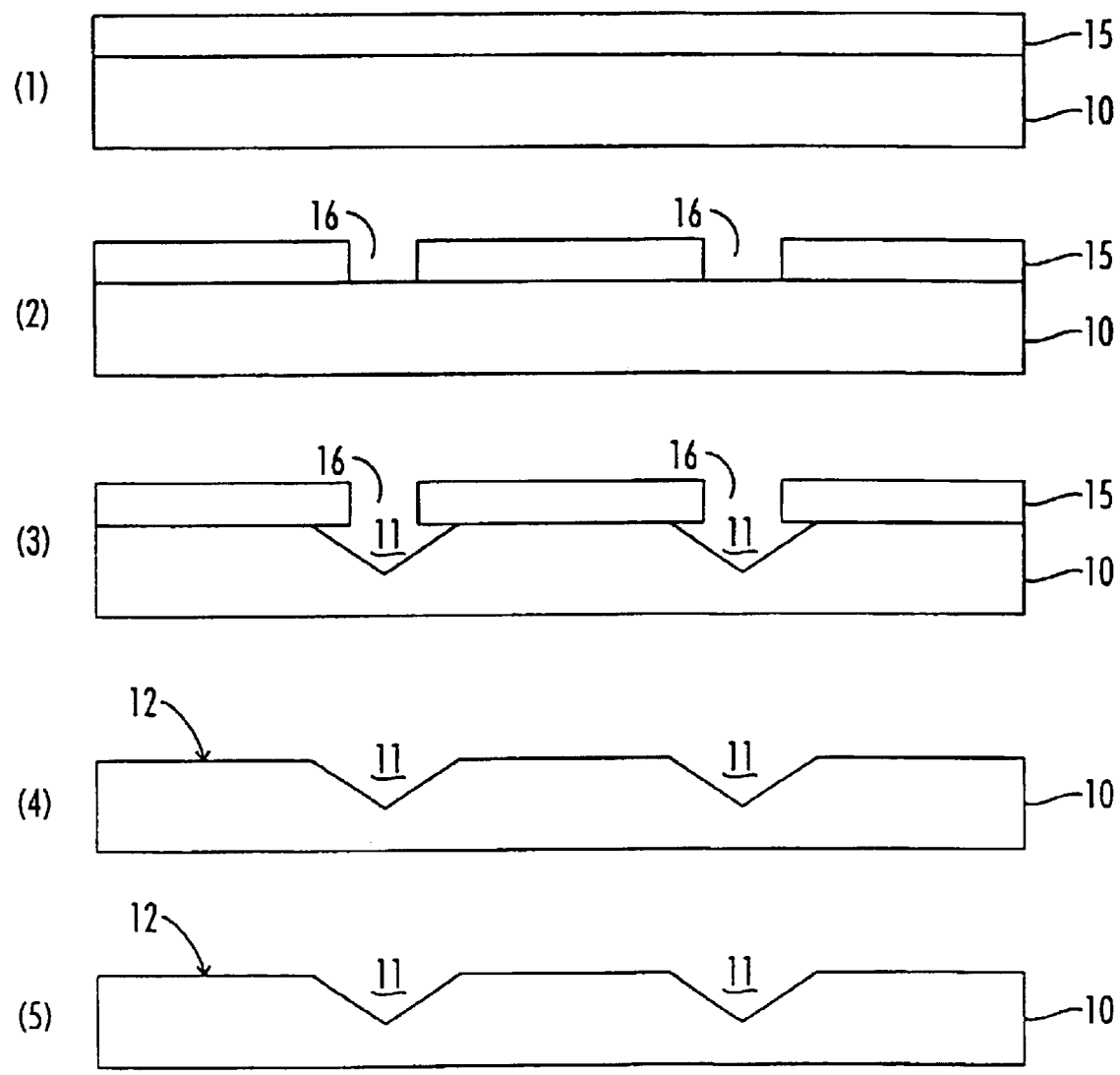
FIGS. 1a and 1b together are a schematic representation of a process for fabricating an array of pyramidal diamond microtip emitters using silicon as a molding substrate.
Figure 1B:
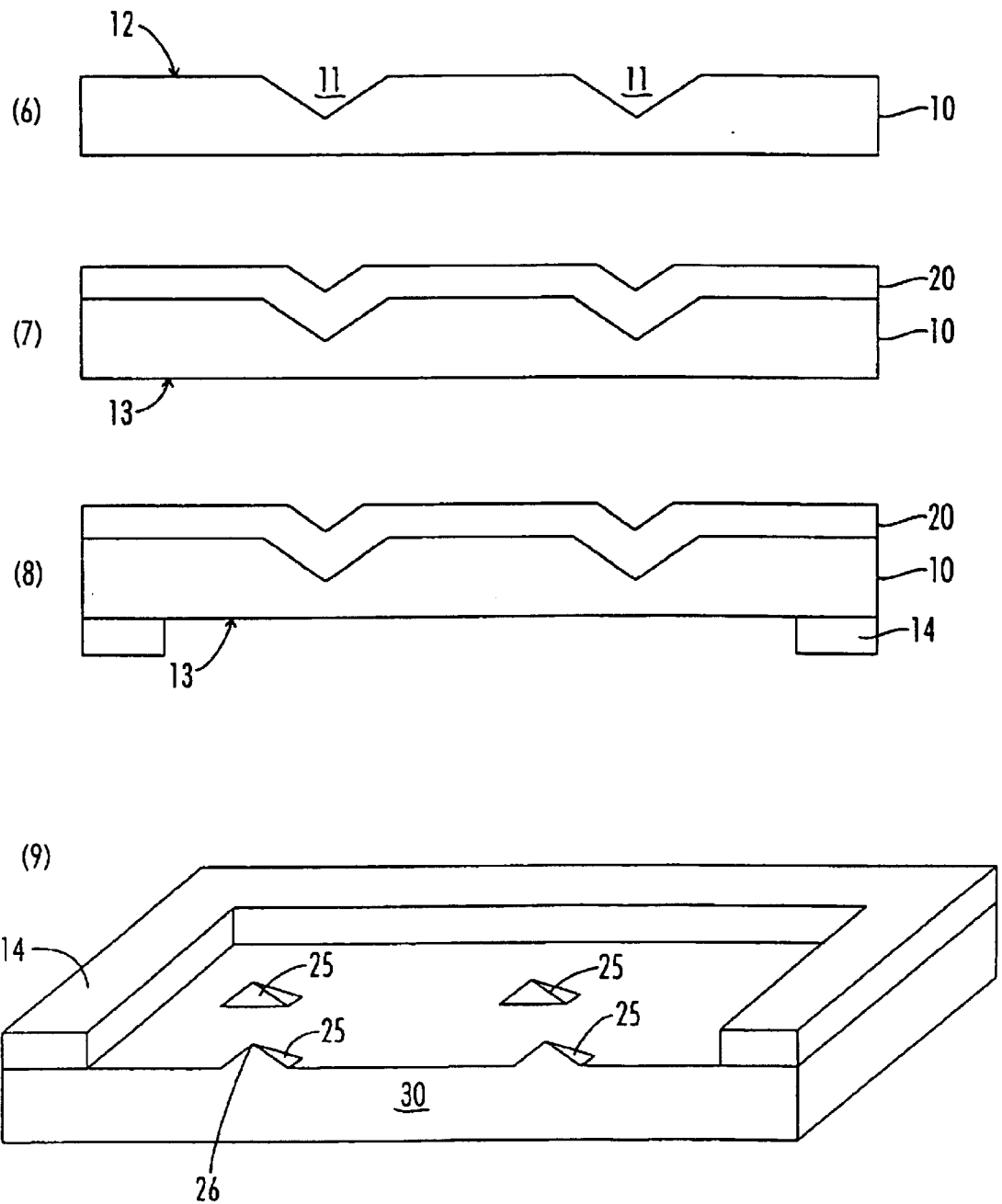

In the novel method of this invention, diamond (polycrystalline, crystalline, amorphous, monocrystalline, diamond-like carbon) field emitter structures and emitter arrays can be fabricated by PECVD or by other diamond deposition processes on a variety of molding substrates, such as semiconductor (Si, Ge, etc.), metal, or insulator (glass, silicon dioxide, etc.). A schematic description of such a process for fabricating an array of pyramidal diamond tipped microstructures using <100> type silicon as a molding substrate is shown in FIGS. 1a and 1b. The fabrication process is started in step (1) by growing a 1 to 1.5 micron silicon dioxide masking layer 5 on a silicon molding substrate 10 using conventional thermal oxidation. Conventional photolithography is then used in step (2) to define a mask layer 15. Elements of the mask layer 15 array are defined by square pattern oxide windows 16. To form the inverted pyramidal structures in step (3), cavities 11 are anisotropically etched in the molding substrate 10 with an etch-stopped process using potassium hydroxide:normal propanol:deionized water solution. In step (4), the remaining portions of the mask layer 15 are removed, leaving the molding substrate 10 with an array of cavities 11. The top surface 12 of the molding substrate 10 is lightly polished in step (5) with a 0.1 $\mu$m particle size diamond paste. The molding substrate 10 is then ultrasonically cleaned in acetone, methanol and deionized water, in step (6). In step (7), a diamond film 20 (undoped, n-type, or p-type), 5–10 microns thick, is deposited into the inverted pyramidal cavities 11 and on top surface 12 of the molding substrate 10, from a mixture of hydrogen and methane gas at a substrate temperature of 850° C.

Optionally in step (8), a second masking layer 14 of silicon dioxide is applied to the lower surface 13 of the molding substrate 10, with all of masking layer 14 and the molding substrate 10 etched away except around the periphery of the substrate 10. This leaves, in step (9), an array of diamond emitters 25 arranged monolithically on an integral diamond substrate 30, with each emitter 25 having a pyramidal shape and a sharply pointed microtip 26 that substantially conforms to the inverted pyramidal shape of its corresponding cavity 11.

In accordance with another novel feature of this method, the diamond is deposited in two distinct sequential processing steps in order to initiate the diamond growth into the cavities 11 and the subsequent deposition of the diamond substrate 30. The primary purpose in using two sequential to processing steps in depositing the diamond is to insure that the tip portion 26 of each emitter 25 is as sharp as possible with improved emission efficiency. To accomplish this, the first or "smooth" deposition step is designed to deposit diamond at and near the tip 26 having a small grain size, preferably less than 2000 Angstroms in breadth. The second or "standard" step is used to complete the deposition of diamond in the cavities and/or across the top surface 12 of the molding substrate 10 at an increased deposition rate to form the diamond substrate 30. Consequently, the grain size of the diamond deposited in the standard deposition step will be larger, but this will not substantially impair the performance of the emitter 25.

One advantage of the method of this invention is that a diamond emitter or emitter array can be fabricated monolithically with an integral diamond substrate. However, the method can also be used to fill the cavities 11 only, with an emitter substrate layer 30 (of diamond or of a different material) created and bonded to the back of the emitters 25 in a separate step. Also, although a two step (smooth then standard) deposition of diamond is preferred, in some applications (such as very small emitters and cavities) the smooth deposition step could be used alone or a third step could be added for purposes of controlling another parameter of the emitter, such as the doping level or carbon graphite content of the diamond.

Achieving a small diamond grain size in the smooth deposition step requires careful control of the deposition process parameters, including deposition energy, methane and hydrogen gas concentration and ratio, chamber pressure, and substrate temperature. A person skilled in diamond plasma deposition techniques can adjust the process parameters of the equipment being used to achieve the small grain sizes needed to carry out the smooth deposition step of this invention. For deposition of diamond using PECVD, examples of fabrication processing parameters are described below that can be used for making different types of diamond microtip emitters.

For a regular diamond microtip emitter, the process parameters for the smooth deposition step are:

Heater (substrate) temperature = 860° C.
Chamber pressure = 12 torr
Hydrogen gas flow = 396 sccm
Methane gas flow 4 sccm
Microwave power = 650 watts
Deposition time = 7 hours The process parameters for the standard deposition step are:

Heater (substrate) temperature = 850° C.
Chamber pressure = 40 torr
Hydrogen gas flow = 500 sccm
Methane gas flow = 5 sccm
Microwave power = 1500 watts
Deposition time = 13 hours For a highly graphitic diamond microtip, the following process parameters should be used for a PECVD smooth deposition step:

Heater temperature = 800° C.
Chamber pressure = 12 torr
Hydrogen gas flow = 135 sccm
Methane gas flow = 15 sccm
Microwave power = 550 watts
Deposition time = 40 hours For a diamond microtip emitter of low graphitic content, the following process parameters should be used for the smooth deposition step:

Heater temperature = 875° C.
Chamber pressure = 10 torr
Hydrogen gas flow = 396 sccm
Methane gas flow = 4 sccm
Microwave power = 650 watts
Deposition time = 1 hour The process parameters for the standard deposition step then are:

Heater temperature = 875° C.
Chamber pressure = 60 torr
Hydrogen gas flow = 500 sccm
Methane gas flow = 5 sccm
Microwave power = 1500 watts
Deposition time = 19 hours Generally speaking, the higher the carbon graphite content in the diamond in the emitter, the higher the emission efficiency. As the $sp^2$ (carbon graphite) content increases, the voltage needed to "turn on" the electric field from the emitter can be reduced from 80 V/$\mu$m to 15 V/$\mu$m. However, at very high levels of carbon graphite content, the durability of the emitter and tip can be impaired. Therefore, in accordance with another objective and novel feature of this invention, the carbon graphite content of the diamond is controlled during deposition to achieve an optimum combination of field emission efficiency and tip durability.

Control of the $sp^2$ content in diamond film deposition by PECVD requires varying the process parameters and/or a combination of the sequence of process parameters. The most critical process parameter that controls $sp^2$ content formation in diamond film is the ratio of methane to hydrogen gas concentration. The higher the methane concentration, the higher the $sp^2$ content in the diamond. A second critical process parameter that controls $sp^2$ content formation in diamond film is the plasma deposition energy level which, in the case of PECVD, is determined by the microwave power level. The microwave power determines the energy of the hydrogen plasma. The higher the energy level of the hydrogen plasma, the more $sp^2$ content etching occurs. Therefore, low microwave power for all high $sp^2$ content steps and high microwave power for all pure diamond steps should be used.

The substrate temperature also has an effect on $sp^2$ content formation in diamond film. A lower substrate temperature should be used for all high $sp^2$ content steps in order to prevent a secondary effect from the hydrogen plasma etching. Finally, the chamber pressure has a secondary effect on $sp^2$ content formation in diamond film. The higher the chamber pressure, the more $sp^2$ content etching by the hydrogen plasma is obtained because the hydrogen plasma is condensed by pressure so that its effective power is increased. Therefore, low pressure should be used for all high $sp^2$ content steps and high pressure is used for all low $sp^2$ content diamond steps.

Examples of process parameters for PECVD diamond deposition during fabrication of diamond (doped and undoped) microtip emitters with controlled carbon graphite content are described below. In some cases, a third deposition step is used to optimize the structure.

TABLE 1

Process parameters for undoped low $sp^2$ content diamond film.

| Number of steps = 2 | Smooth Step fine diamond | Standard Step low $sp^2$ content |
| --- | --- | --- |
| Substrate Temperature (C) | 875 | 875 |
| Chamber Pressure (Torr) | 10 | 60 |
| Hydrogen gas flow rate (sccm) | 396 | 500 |
| Methane gas flow rate (sccm) | 4 | 5 |
| Microwave power level (W) | 650 | 550 |
| Time (hours) | 1 | 40 |

TABLE 2

Processing parameters for undoped moderate $sp^2$ content diamond film.

| Number of steps = 3 | Step 1 high $sp^2$ diamond | Step 2 fine diamond | Step 3 standard diamond |
| --- | --- | --- | --- |
| Substrate Temperature (C) | 800 | 860 | 850 |
| Chamber Pressure (Torr) | 10 | 11.8 | 40 |
| Hydrogen gas flow rate (sccm) | 138 | 396 | 500 |
| Methane gas flow rate (sccm) | 15 | 4 | 5 |
| Microwave power level (W) | 550 | 650 | 1500 |
| Time (hours) | ¾ | 7 | 13 |

TABLE 3

Processing parameters for undoped high $sp^2$ content diamond film.

| Number of steps = 1 | Step 1 high $sp^2$ content diamond |
| --- | --- |
| Substrate Temperature (C) | 800 |
| Chamber Pressure (Torr) | 11.8 |
| Hydrogen gas flow rate (sccm) | 135 |
| Methane gas flow rate (sccm) | 25 |
| Microwave power level (W) | 550 |
| Time (hours) | 45 |

TABLE 4

Process parameters for p-type moderate $sp^2$ content diamond film.

| Number of steps = 3 | Step 1 high $sp^2$ diamond | Step 2 fine diamond | Step 3 standard diamond |
| --- | --- | --- | --- |
| Substrate Temperature (C) | 875 | 875 | 575 |
| Chamber Pressure (Torr) | 10 | 11.8 | 40 |
| Hydrogen gas flow rate (sccm) | 138 | 396 | 500 |
| Methane gas flow rate (sccm) | 15 | 4 | 5 |
| Microwave power level (W) | 550 | 650 | 1500 |
| Time (hours) | ¾ | 7 | 13 |

TABLE 5

Process parameters for p-type high $sp^2$ content diamond film.

| Number of steps = 1 | Step 1 high $sp^2$ content diamond |
| --- | --- |
| Substrate Temperature (C) | 900 |
| Chamber Pressure (Torr) | 11.8 |
| Hydrogen gas flow rate (sccm) | 135 |
| Methane gas flow rate (sccm) | 25 |
| Microwave power level (W) | 550 |
| Time (hours) | 45 |

In the examples described above, the p-type diamond film was fabricated via a conventional in situ boron solid source doping method and n-type diamond film was fabricated using conventional in situ gas phase doping. Selective etching of the silicon molding substrate 10 (FIGS. 1a and 1b) was performed to expose the array of diamond microtip emitters 25 on a free standing diamond substrate 30. The backside of the diamond substrate 30 (opposite to the emitters 25) was sputtered with gold to create an ohmic contact.

Figure 2A:
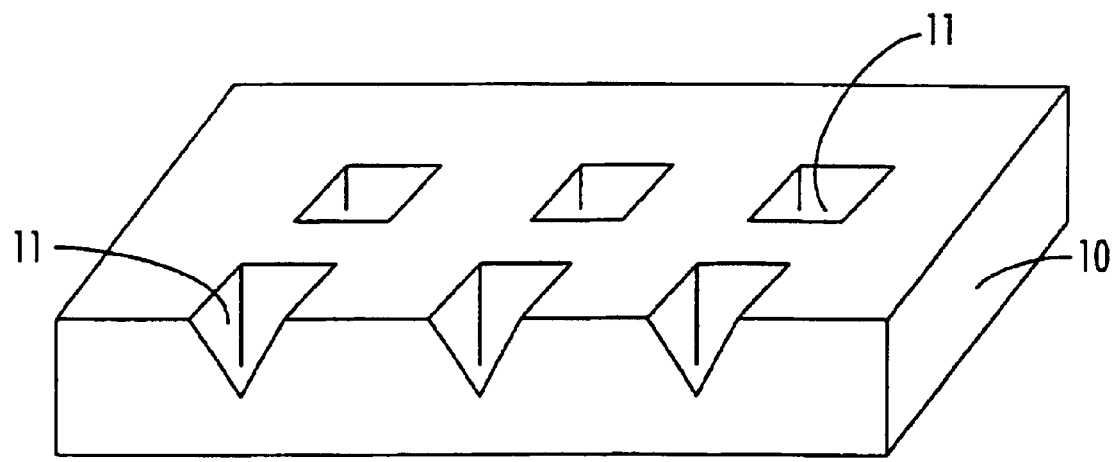
FIG. 2a is a perspective view of a molding substrate with cavities that can be utilized for fabricating an array of pyramidal diamond microtip field emitters.
Figure 2B:
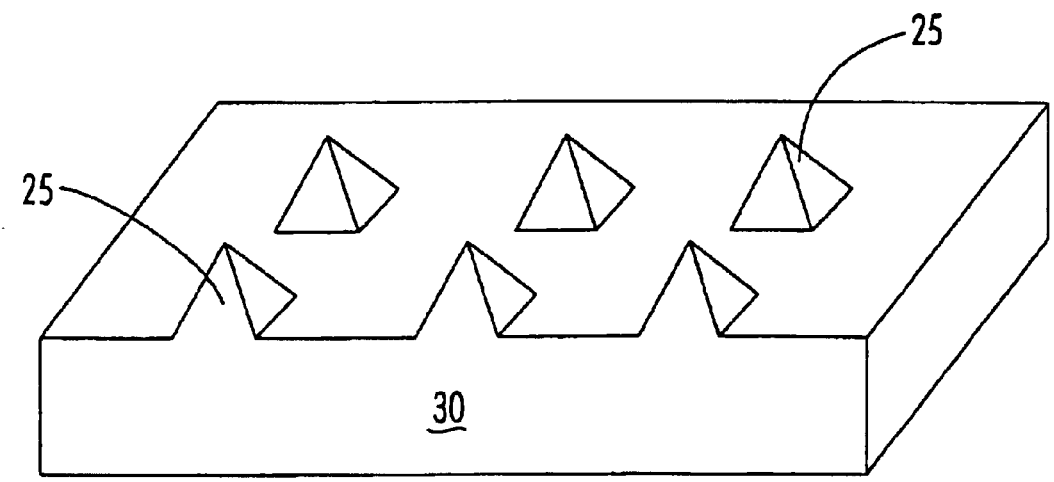

FIG. 2a shows a typical molding substrate 10 with an array of inverted pyramidal cavities 11 etched therein using the method described above. FIG. 2b shows a corresponding array of pyramidal diamond microtip emitters 25 formed on a diamond substrate 30 using the molding substrate 10 of FIG. 2a.

Figure 3A:
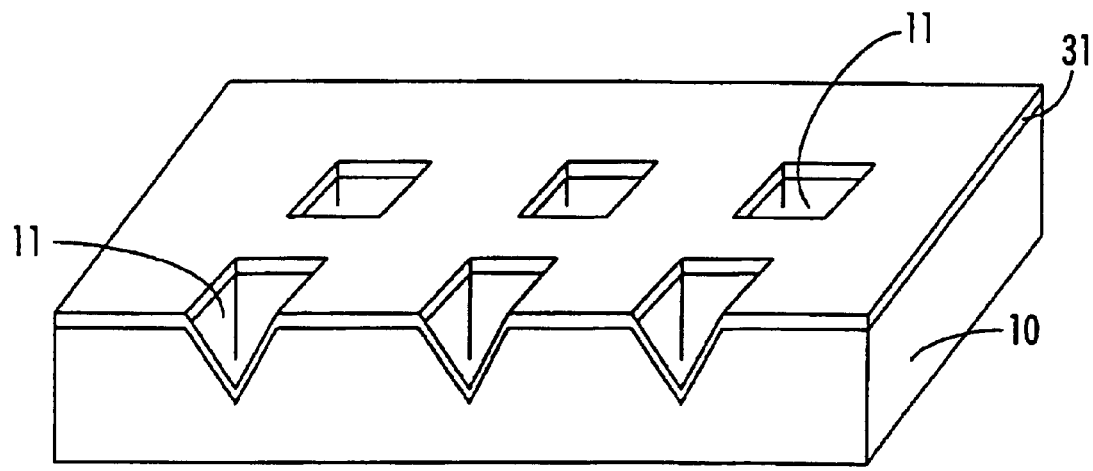
FIG. 3a is a perspective view of a molding substrate that can be utilized is for fabricating an array of diamond microtip field emitters, with a dielectric layer of silicon dioxide added to form a gated diode structure.
Figure 3B:
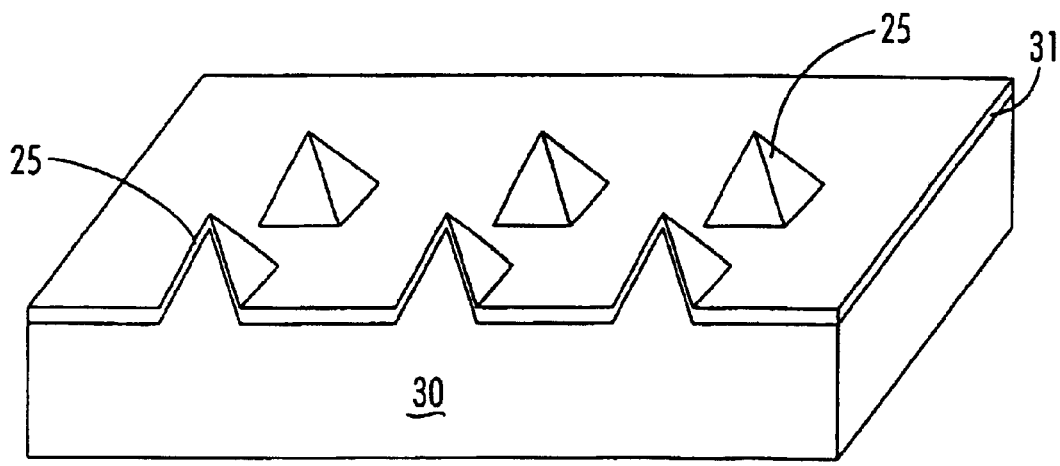

FIGS. 3a and 3b illustrate a molding substrate 10 in which an array of pyramidal emitters 25 is fabricated using a further step in the process wherein a dielectric layer 31, of silicon dioxide or other similar material, is deposited into the cavities 11 and across the top surface of the molding substrate 10 before deposition of the diamond layer. This creates the emitter array of FIG. 3b, which now can be used for a gated diode device.

Figure 4A:
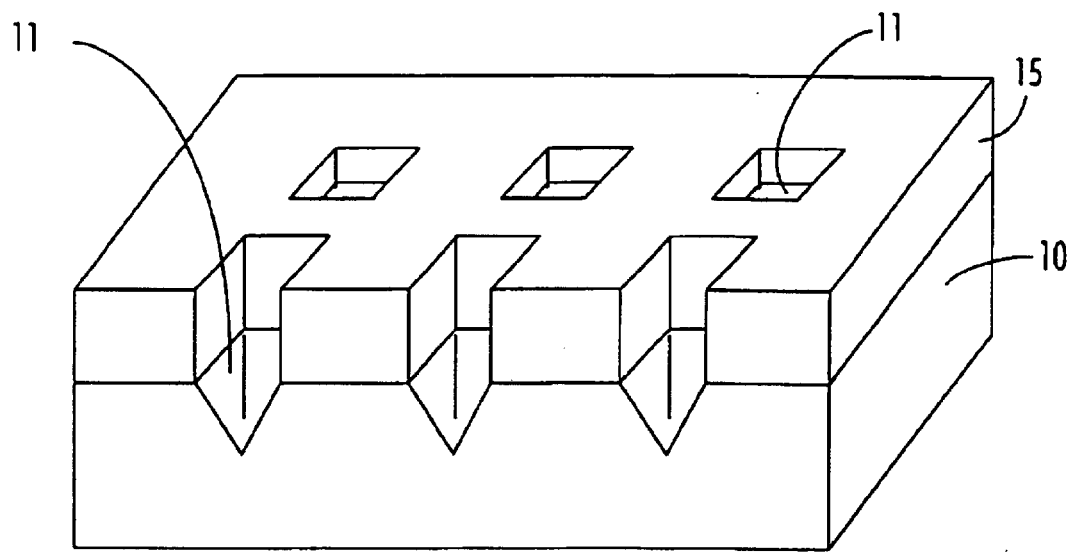
FIG. 4a is a perspective view of a mold pattern and silicon substrate that can be utilized for micro-patterning an array of high aspect ratio, pillar-type diamond microtip emitters, with a layer of silicon dioxide added to the silicon substrate.
Figure 4B:
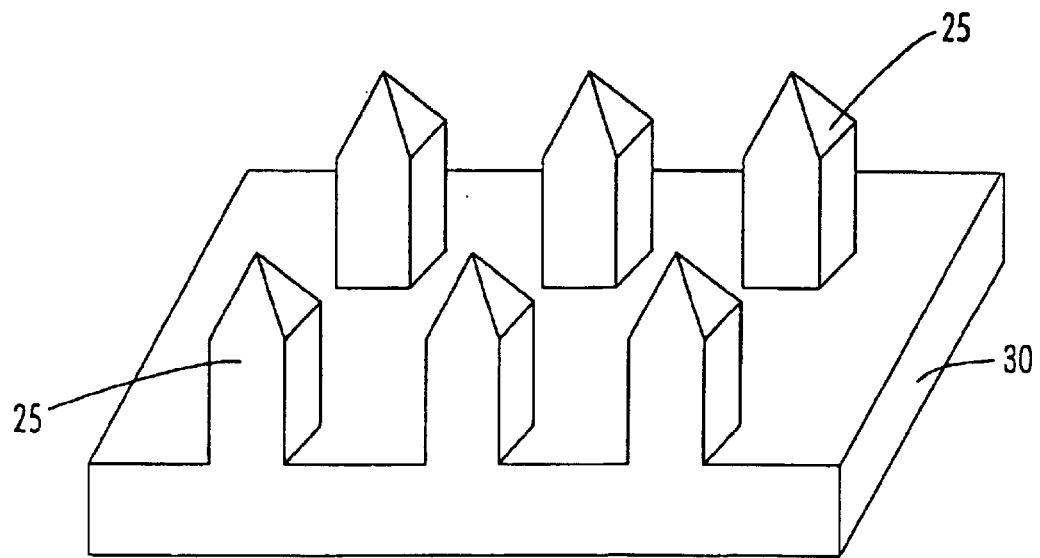

Of course, useful diamond microtip emitters can be fabricated in other than pyramidal shapes. For example, some applications may benefit from using an emitter 25 in the shape of a high aspect ratio pillar, as shown in FIGS. 4a and 4b. For an emitter of this shape, the masking layer 15 will be left on during deposition of the diamond, effectively extending the depth of the cavities 11.

Figure 5A:
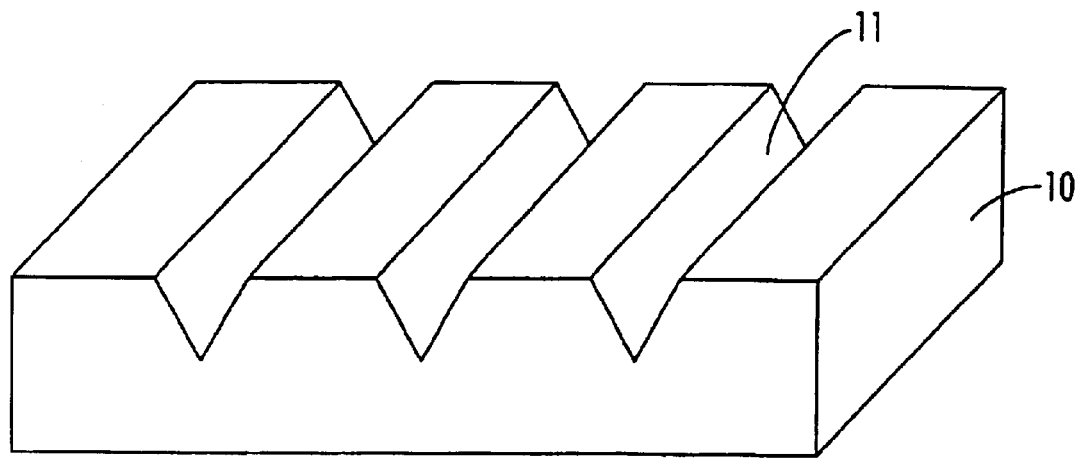
FIG. 5a is a perspective view of a mold pattern and silicon substrate that can be utilized for fabricating knife-edge type diamond microtip emitters.
Figure 5B:
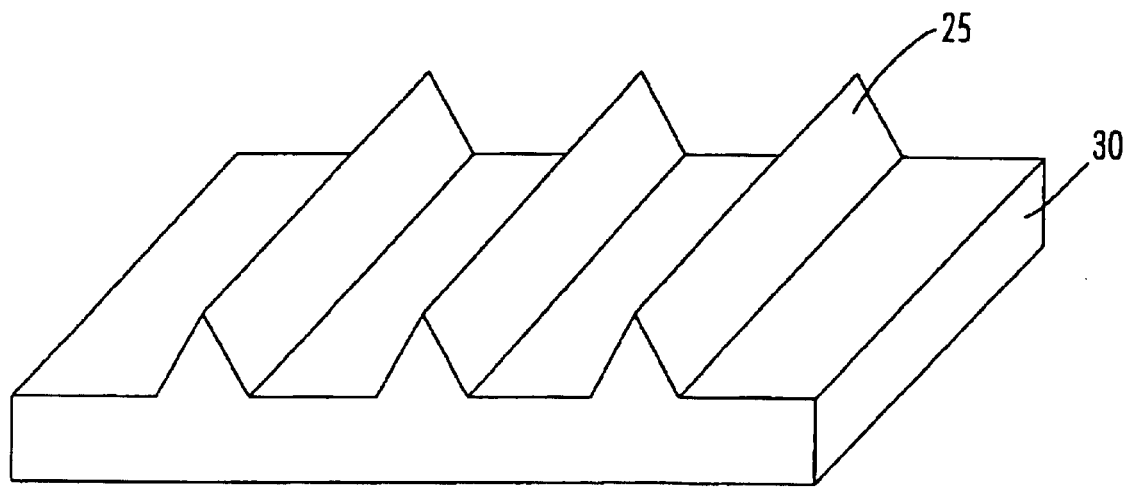

FIGS. 5a and 5b show a molding substrate 10 with cavities 11 used to form an array of knife-edge shaped diamond microtip emitters 25 on a substrate 30.

Figure 6A:
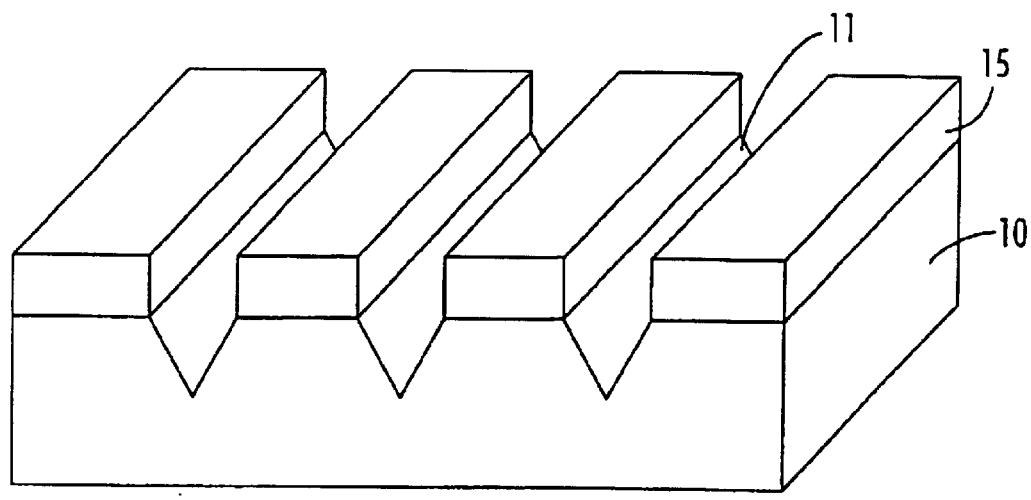
FIG. 6a is a perspective view of a mold pattern and silicon substrate (with added layer of silicon dioxide) that can be utilized for fabricating an array of high aspect ratio, knife-edge type diamond microtip emitters.
Figure 6B:
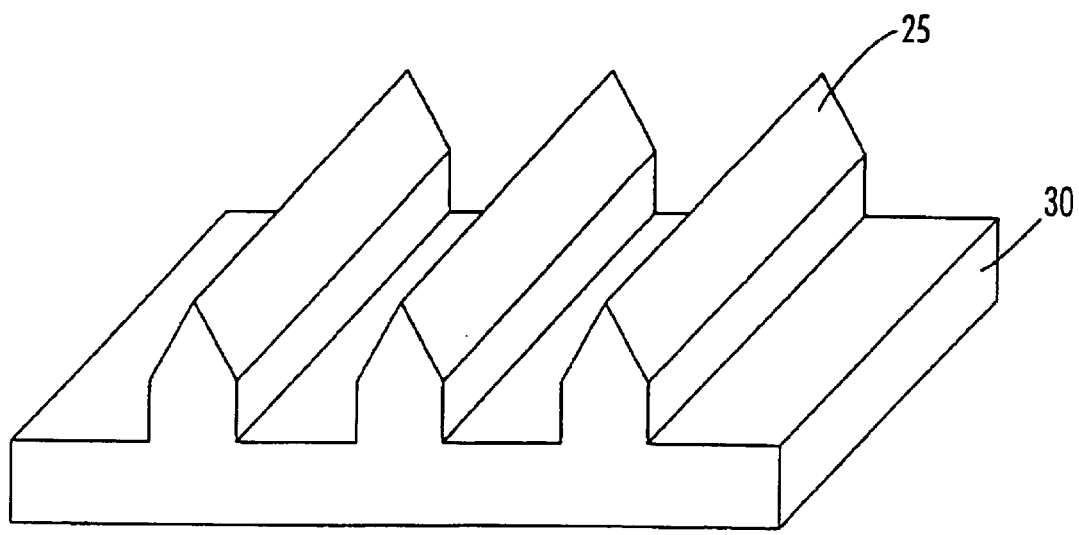

FIGS. 6a and 6b show a molding substrate 10 with cavities 11 used to form an array of high aspect ratio knife-edge shaped diamond microtip emitters 25 on a substrate 30, using masking layer 15.

Figure 7A:
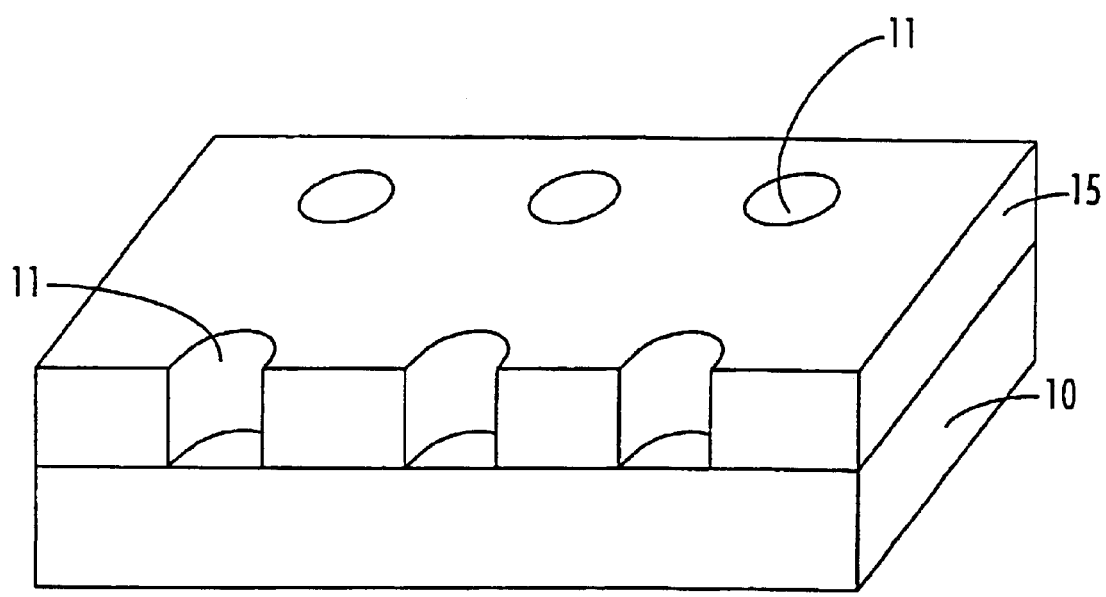
FIG. 7a is a perspective view of a mold pattern and silicon substrate (with added layer of silicon dioxide) that can be utilized for fabricating an array of cylindrical diamond microtip emitter structures.
Figure 7B:
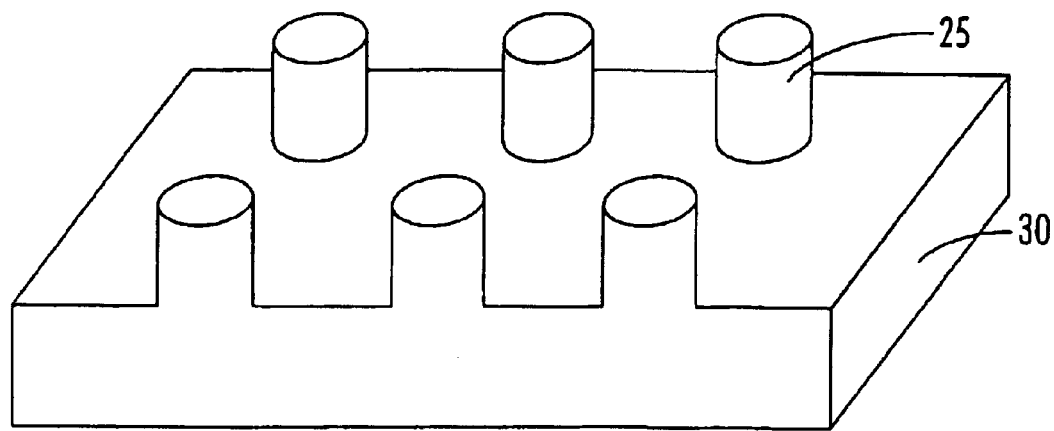

FIGS. 7a and 7b show a molding substrate 10 with cavities 11 used to form an array of high aspect ratio cylindrical diamond microtip emitters 25 on a substrate 30, using masking layer 15.

Figure 8A:
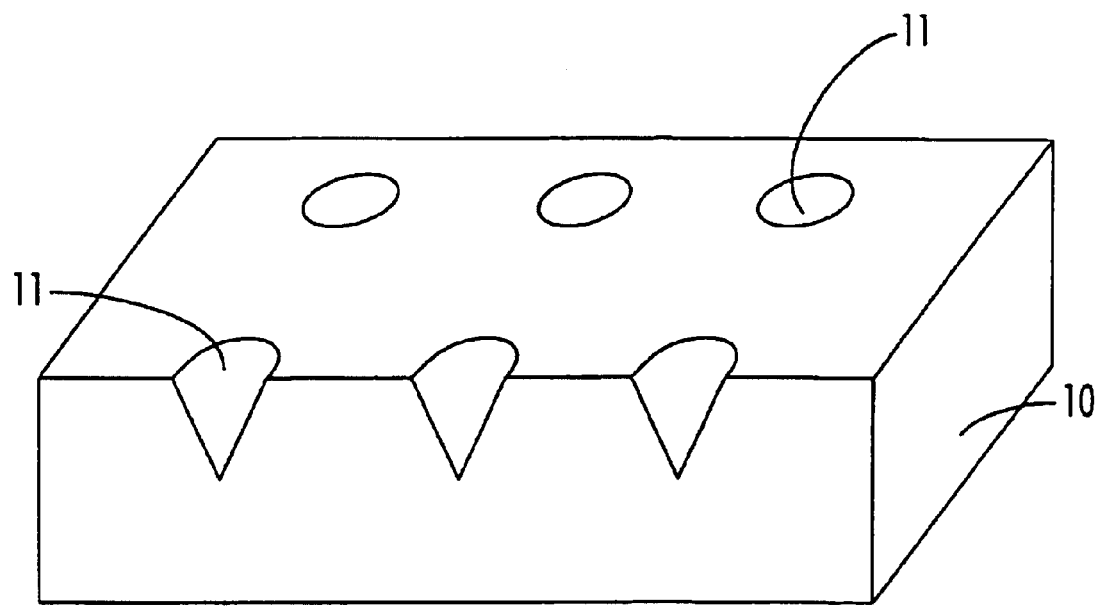
FIG. 8a is a perspective view of a mold pattern and silicon substrate that can be utilized for fabricating an array of conical microtip field emitter structures.
Figure 8B:
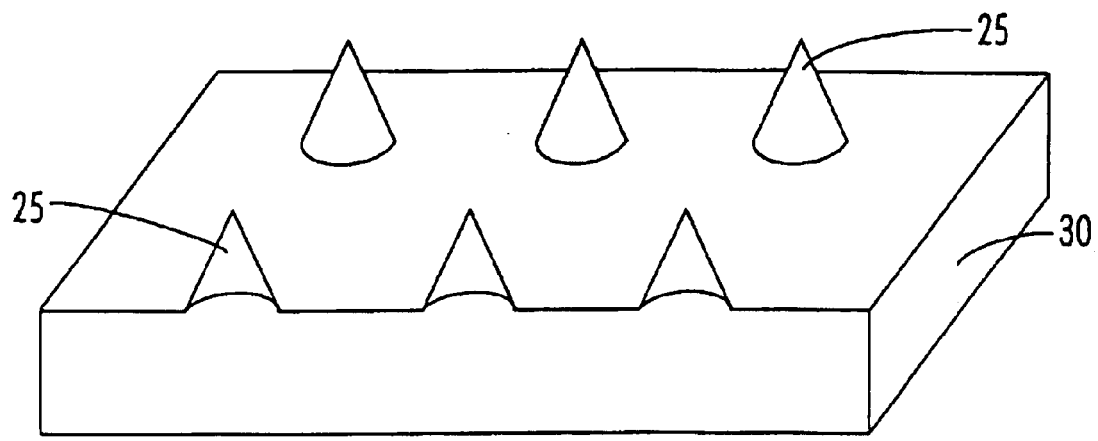

FIGS. 8a and 8b show a molding substrate 10 with cavities 11 used to form an array of conical diamond microtip emitters 25 on a substrate 30, using masking layer 15.

Figure 9:
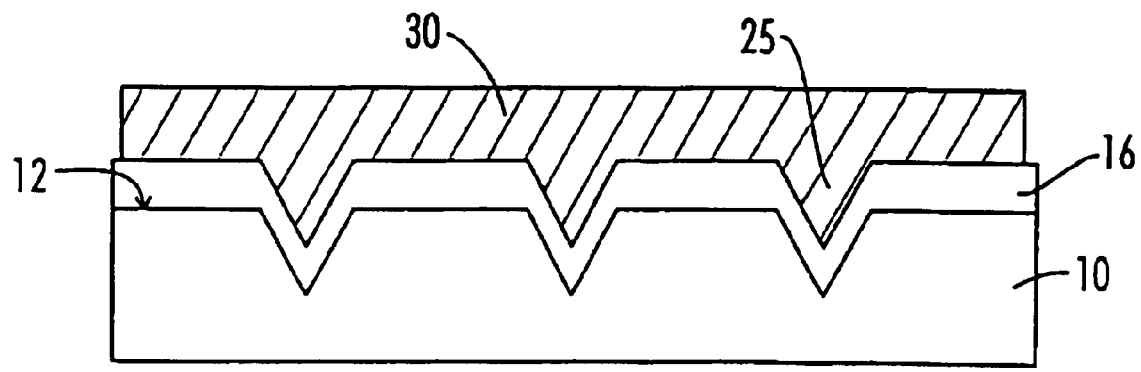
FIG. 9 is a cutaway side view showing diamond which has been deposited over a silicon dioxide etch layer, on a reusable silicon mold.

The fabrication methods of this invention can also be employed so that the molding substrate is re-usable. This technique is illustrated in FIG. 9. Before the diamond is deposited, a release layer 16 of a material such as silicon dioxide is deposited into the cavities 11 and across the top surface 12 of a silicon molding substrate 10. After the diamond (emitters 25 and substrate 30) is deposited over the release layer 16, the diamond microtip emitters 25 and substrate 30 can be separated from the release layer 16 by thermal differential or controlled reduction, leaving the molding substrate intact. The release layer 16 is then etched away.

Figure 10:
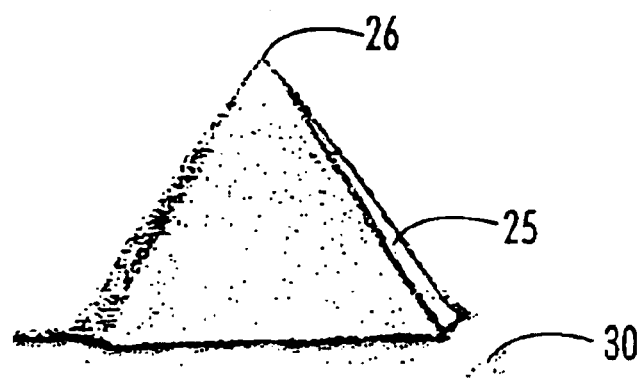
FIG. 10 is a scanning electron microscopy (SEM) picture of a pyramidal diamond microtip emitter on a free standing diamond substrate, as fabricated in accordance with the present invention.

A scanning electron microscopy (SEM) photograph of a pyramidal diamond microtip emitter 25 on a free standing diamond substrate 30, fabricated using the method of this invention, is shown in FIG. 10. The emitter 25 at its base is approximately 3 $\mu$m×3 $\mu$m, with a radius at the tip 26 of less than 200 A.

Figure 11A:
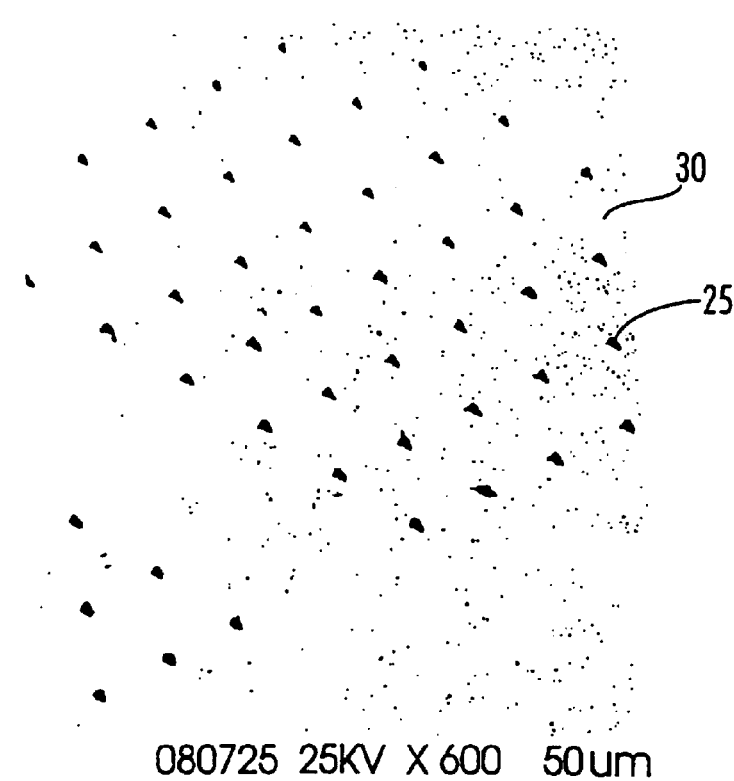
FIGS. 11a and 11b are SEM pictures of an array of 7×7 diamond pyramidal microtip emitters, monolithically integral with a diamond substrate, as fabricated in accordance with the present invention.
Figure 11B:
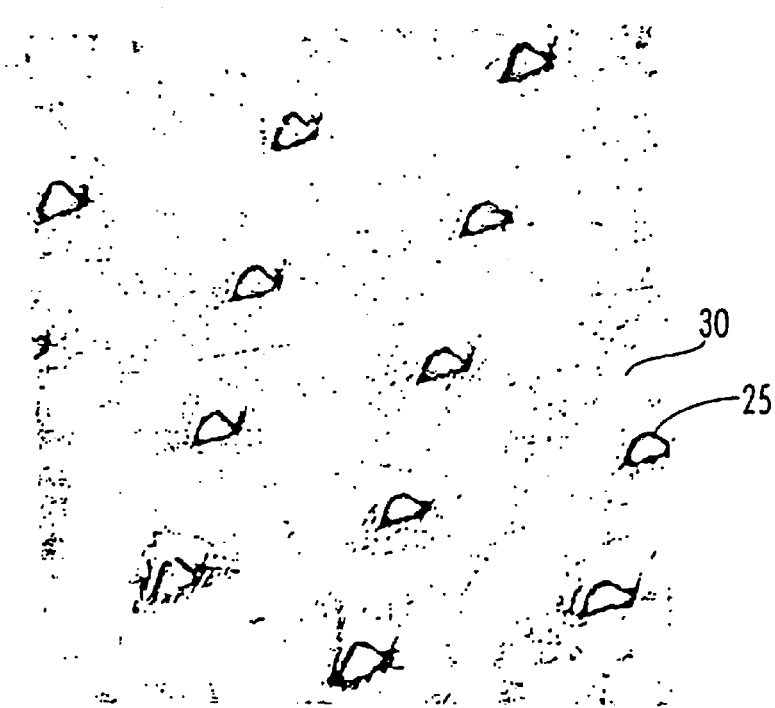

FIGS. 11a and 11b show an array of 7×7 pyramidal diamond microtip emitters 25 monolithically integral with a diamond substrate 30, also fabricated in accordance with the method of this invention. Inside the array, the separation distance between each emitter 25 pyramid is 10 $\mu$m. Typical Raman spectroscopy of these diamond microtip emitters 25 and the diamond substrate 30 shows the 1332 cm$^{-1}$ peak of the sp$^3$ diamond bond, along with a low broad graphite peak at 1580 cm$^{-1}$. As evident by the SEM micrographs of FIGS. 11a and 11b, the capability of patterning diamond microtip emitters that are monolithically integral with a diamond substrate is demonstrated. Selective deposition and molding of undoped or doped diamond films in silicon (and other types of substrates) molds, and subsequent creation of free standing diamond plates with well-patterned diamond microtips, has been achieved.

Treatment of Diamond Microtip Emitters to Enhance Emission Performance

The electron field emission behavior of the emitter 25 can be improved by subjecting the post fabricated diamond microtip emitter 25 to hydrogen plasma treatment. Depending on the hydrogen plasma power and treatment time, the radius of the diamond tip 26 can be sharpened to the nanometer range. Typical post fabrication hydrogen plasma treatment parameters are:

Heater (substrate) temperature = 850°
Chamber pressure = 40 torr
Hydrogen gas flow = 500 sccm
Microwave power = 1500 watts
Treatment time = several minutes to the range of an hour High temperature annealing processes, such as high temperature activation or initiation, can also be applied to improve the diamond tip field emission behavior. For example, activation of a gated emitter device can be conducted under the following thermal and electric conditions:

Baking the device at 250° in vacuum and applying a gate voltage to keep the device operation at a low emission state for at least several hours. Attention must be paid in this process to avoid the rise of emission current to a value more than 2 $\mu$a. The device performance can be greatly improved after this treatment. The onset gate voltage is reduced and the emission is stabilized.

Figure 38:
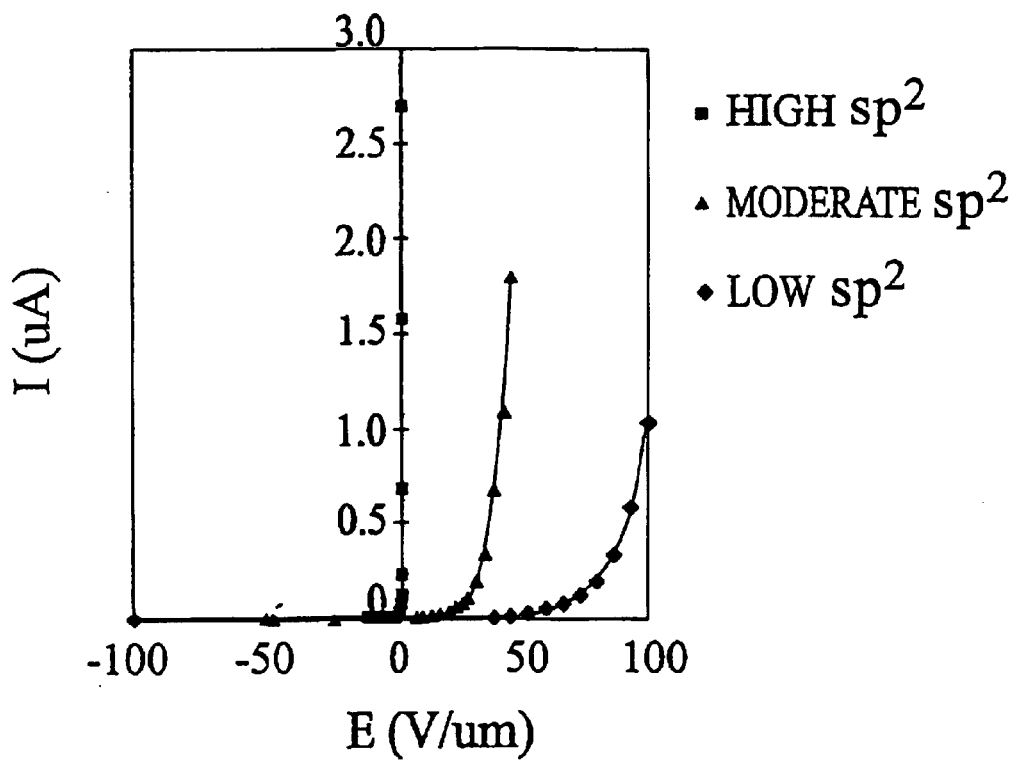
FIG. 38 is a graphical representation of the relationship between the field emission performance of a diamond microtip emitter fabricated in accordance with this invention and the carbon graphite content of the diamond in the emitter.
Figure 39:
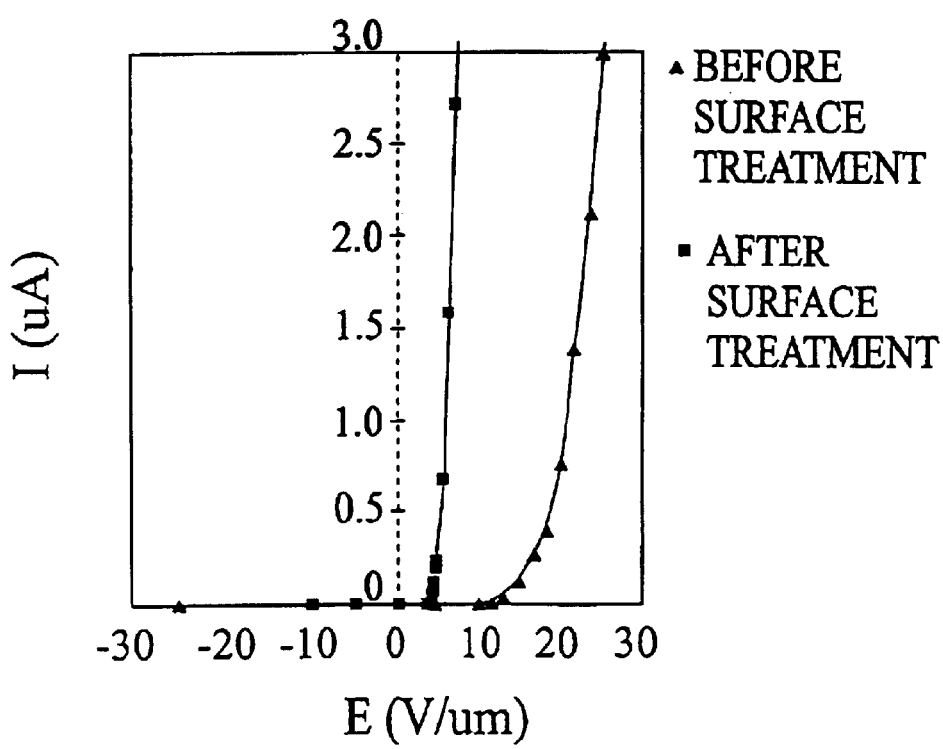
FIG. 39 is a graphical representation of the change in field emission performance of a diamond microtip emitter fabricated in accordance with this invention after treatment of the emitter using the vacuum-thermal-electric process of this invention.

As discussed above, this invention demonstrates that the field emission characteristics of the diamond can be significantly improved by increasing the sp$^2$ content of the diamond microtip emitter. To further enhance this characteristic, a vacuum-thermal-electric (VTE) treatment step can be performed on the fabricated emitters. As the sp$^2$ content of the diamond increases, the turn-on electric field is reduced from 40 V/$\mu$m to 4 V/$\mu$m. That is, for low sp$^2$ content diamond tips, the turn-on electric field is reduced from 80 V/$\mu$m to 40 V/$\mu$m after VTE treatment and for high sp$^2$ content diamond tips, the turn-on electric field is reduced from 15 V/$\mu$m to 4 V/$\mu$m after VTE treatment. Therefore, the turn-on electric field can be reduced more than 50% by increasing the sp$^2$ content and VTE treatment. The relationship between emitter efficiency and sp2 content of the diamond is shown in FIG. 38. FIG. 39 shows the change in emission characteristics of the emitter after VTE treatment in accordance with this invention.

The novel vacuum-thermal-electric treatment of the diamond microtip emitter of this invention will improve the performance and stability of the diamond tip. A typical VTE treatment of the emitter can be carried out as follows:

At room temperature and in the vacuum environment of 10$^{-6}$ Torr, the fabricated diamond microtip emitters are subjected to voltages that are gradually increased from zero until a significant emission current is detected. At the beginning stage, the emission is usually unstable because there is contamination on the tip surface. Vacuum-thermal-electric (VTE) treatment is conducted on the emitters by heating the emitter device slowly to approximately 150 C. in the same vacuum environment of 10$^{-6}$ Torr or better. The device is maintained at 150 C. for several hours while the emission current is kept below 2 $\mu$A by adjusting the applied voltage. The VTE treatment is terminated when a stable current is obtained for a considerable period of time, usually 1 hour. The devices are then cooled down slowly to room temperature. The emission currents after VTE treatment were confirmed to be significantly improved in terms of performance and stability.

Field emission of the diamond microtip emitter can also be improved by surface treatment of the emitters with a thin-film metal coating. Certain types of metal coatings (gold, for example), in conjunction with control of the sp$^2$ content of diamond emitter, can enhance the emission by: (i) lowering the work function due to the sp$^2$ defect induced band and gold induced negative electron affinity on the diamond tip surface; and (ii) the increase in field enhancement factor due to the enhanced electric field via the metal-insulator-metal microstructure and field forming process in the tip region.

To apply a performance enhancing gold coating to the emitters in accordance with this invention, the following steps can be used.

After the polycrystalline diamond film deposition, the silicon molding substrate 10 was etched away with a mixture of HF:HNO$_3$ (2:1) solution. The emitters 25 were then cleaned with acetone and methanol. The emitter samples were cleaned with acetone and dehydrated at 300 C. for 5 minutes in order to make the surface clean. A thin layer of gold with a nominal thickness of 200–250 Angstroms was sputtered on the surface of the emitter tip 26. The emitters 25 were then annealed at 900 C. for 10–15 minutes.

Figure 40:
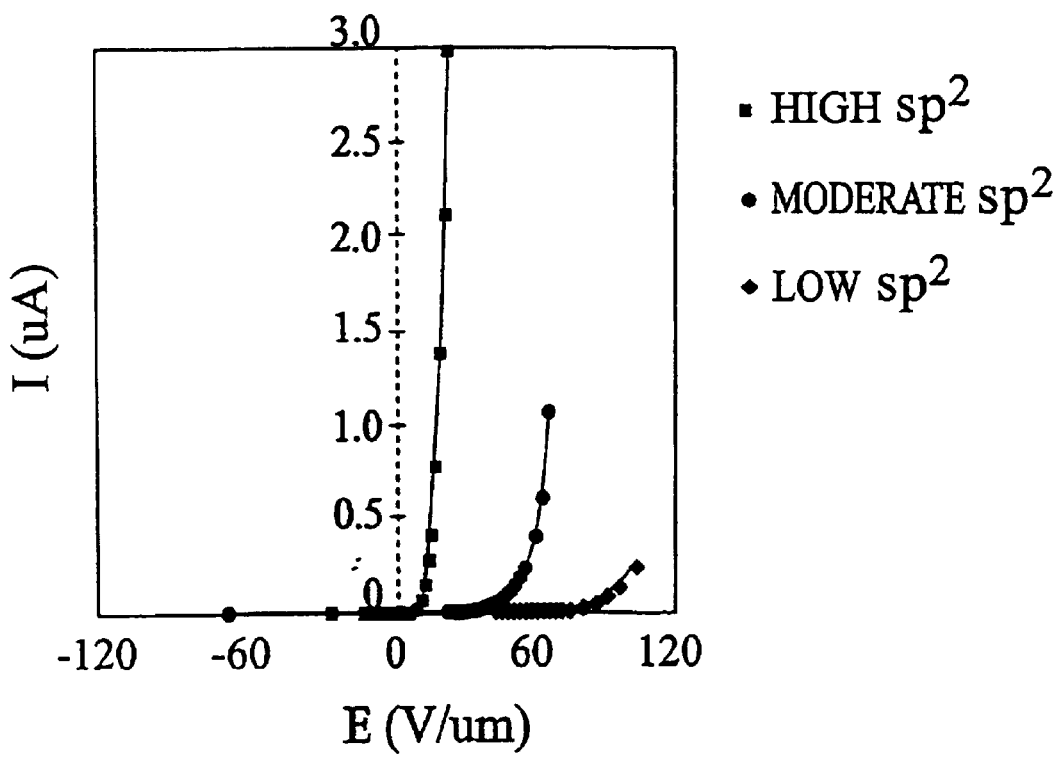
FIG. 40 is a graphical representation of the field emission performance of a typical diamond microtip emitter at various levels of carbon graphite content, before application of a metal coating to the emitter.
Figure 41:
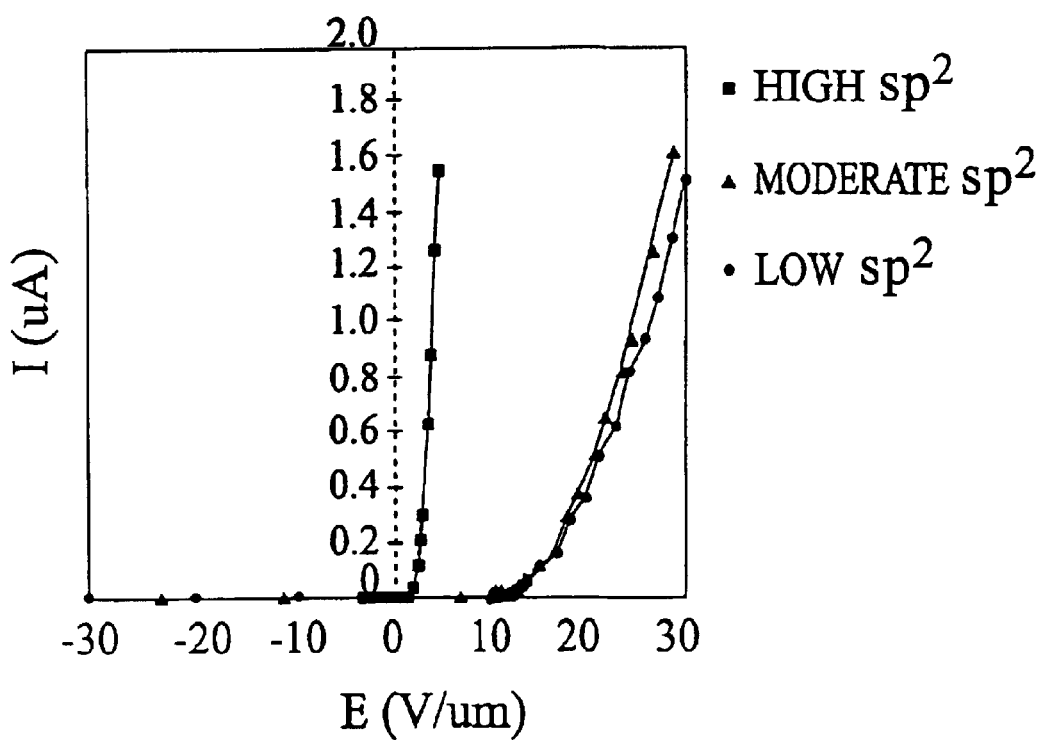
FIG. 41 is a graphical representation of the field emission performance of a typical diamond microtip emitter at various levels of carbon graphite content, after application of a gold coating to the emitter in accordance with this invention.

The change in emitter performance at different levels of carbon graphite content is shown in FIG. 40 (before treatment) and FIG. 41 (after treatment). This shows that the field emission characteristics of the diamond can be significantly improved by applying a thin gold coating and by increasing the sp² content of the diamond in the emitter. Before gold coating, as the sp² content increases, the turn-on electric field is reduced from 70 V/μm to 15 V/μm. After gold coating, as the sp² content increases, the turn-on electric field is reduced from 12 V/μm to 3 V/μm. That is, for low sp² content diamond emitters, the turn-on electric field is reduced from 70 V/μm to 12 V/μm by gold coating. For high sp² content diamond emitters, the turn-on electric field is reduced from 15 V/μm to 3 V/μm after gold coating. Therefore, the turn on electric field can be reduced more than 75% by increasing the sp² content and applying a gold coating.

Figure 42:
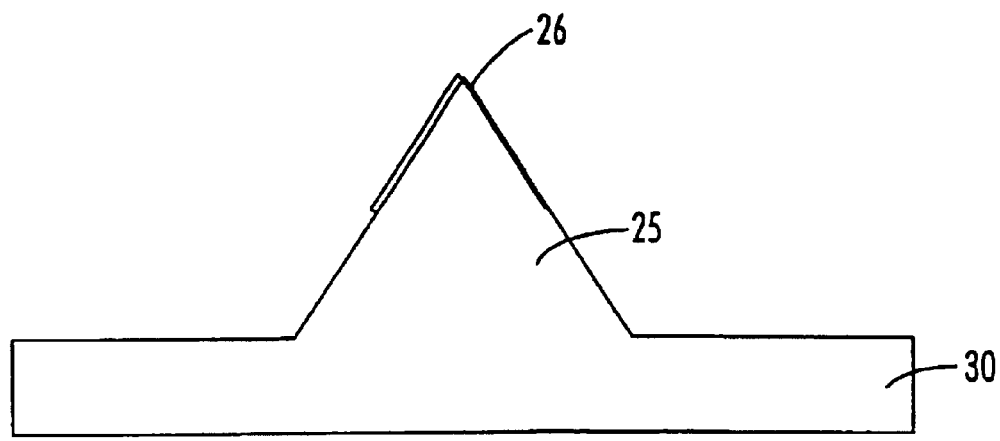
FIG. 42 is a side cutaway view of a pyramidal diamond microtip emitter of the present invention.
Figure 43:
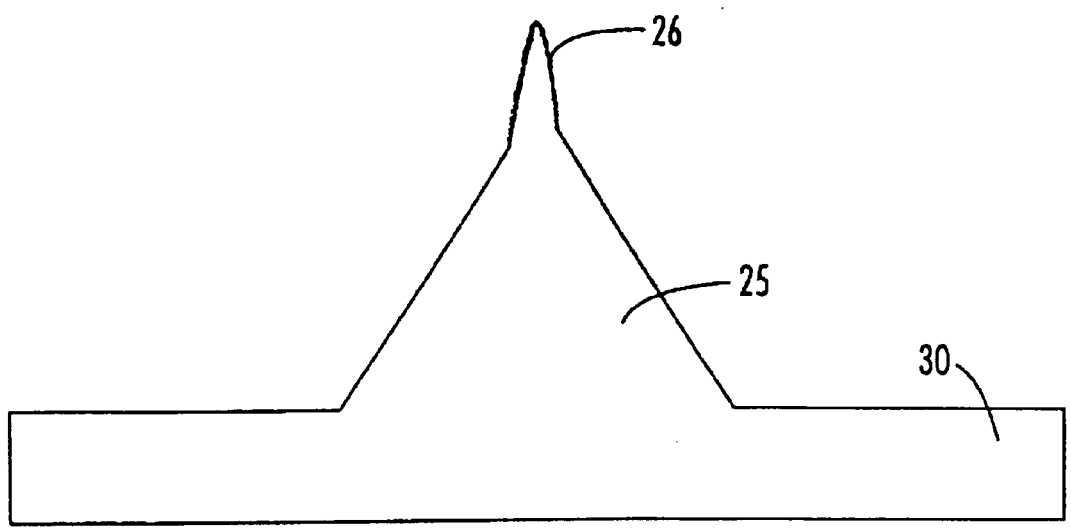
FIG. 43 is a side cutaway view of the pyramidal diamond microtip emitter of FIG. 42, after plasma sharpening of the tip.

The geometry of the tip portion 26 of the emitter 25 plays an important role in field emission. The use of oxygen or hydrogen plasma for micro etching can produce an ultra-sharp tip for improved field emission. For example, FIGS. 42 and 43 show a diamond microtip emitter 25 of this invention before and after plasma sharpening of the tip portion 26.

Finally, thermal oxidation of the cavities in a silicon or other molding substrate, before diamond deposition, can improve the geometry of the tip portion 26 of the emitter 25. Due to the preferential oxidation of silicon, the tip of the cavity in silicon is ultra-thin thereby producing an ultra-sharp diamond tip.

Diamond Microtip Emitters for Vacuum Diode and Triode Devices

The diamond microtip emitter structures as fabricated and described above can be employed in a variety of novel diamond vacuum diode and triode configurations. In such devices, operation in the field emission process is controlled by Fowler-Nordheim tunneling, as described in C. A. Spindt, et al., "Research into Micron-size Emission Tubes", IEEE Conf. on Tube Techniques, 1966.

The emission current density is given by:

$$J = K_1(E^2/\Phi)\exp[-(K_2\Phi^{3/2})/E] \quad (1)$$

where $K_1$ and $K_2$ are constants, and $\Phi$ is the work function of the emitting surface.

The electric field E is defined as:

$$E = (\beta V)/d \quad (2)$$

where V is the anode-cathode voltage, β is the field enhancement factor controlled by the cathode radius of curvature at the point of emission, and d is the spacing between the cathode (emitter) tip and the anode.

The field at the apex of the tip is inversely proportional to the tip radius. The sharp needle tips of the diamond-microtip pyramidal emitter structures are fabricated to enhance the electric field at the apex and promote high emission current.

Figure 12:
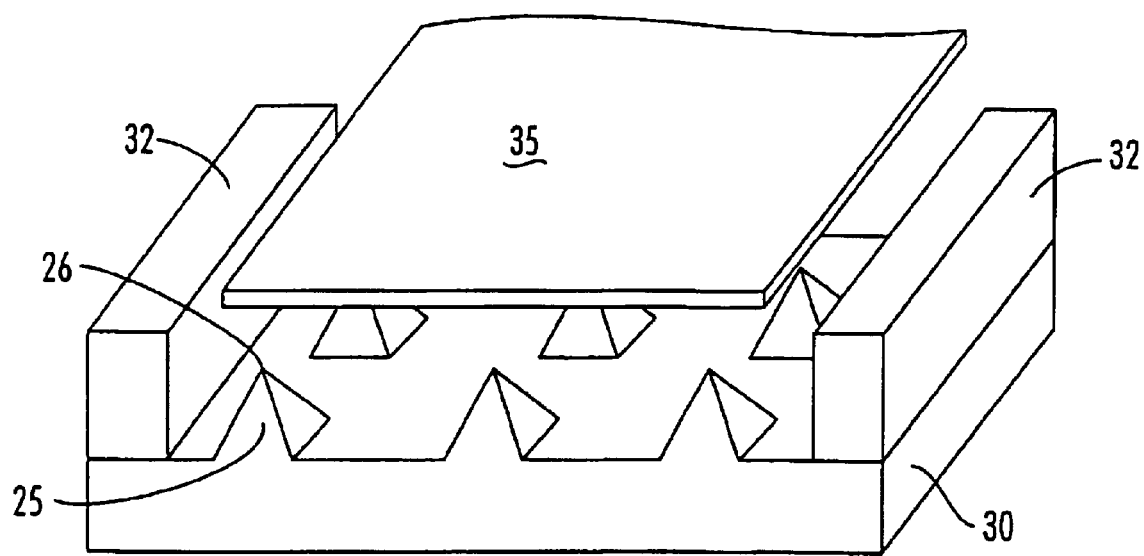
FIG. 12 is a perspective view of a first embodiment of a diode device, fabricated using an array of diamond microtip pyramidal emitters as the cathode.
Figure 18:
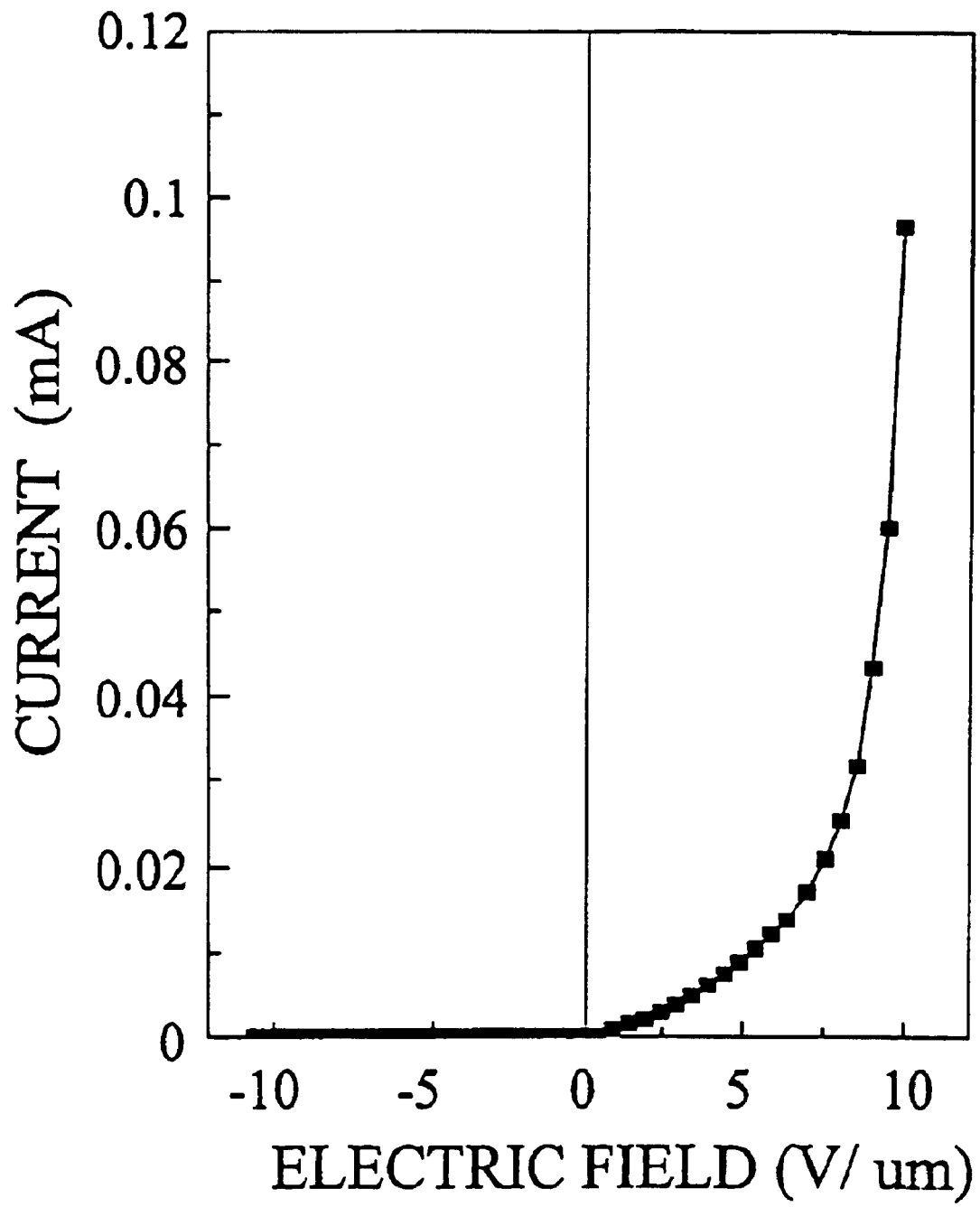
FIG. 18 is a graphical plot of the relative change in emission current of the microtip array versus applied field, as measured in the diamond diode device configuration of FIG. 12.

FIG. 12 shows a basic diode device fabricated using an array of diamond microtip emitters 25 on a diamond substrate 30 to form a cathode. An anode 35 is supported above the emitters 25 by an insulating support structure 32. The relative change in emission current of the microtip emitter array versus applied field, in a diode configuration of FIG. 12, is shown in FIG. 18. The data indicate that a high current (0.1 mA) in forward bias can be obtained under a low electric field of less than 10 V/μm at a vacuum of $10^{-6}$ torr. No emission current was observed in the reverse bias regime. The anode 35 for these measurements is a tungsten probe, 1 mm in diameter, and placed 100 μm in above the diamond microtip emitters 25. To further illustrate that the measured current is indeed due to electron emission from the diamond pyramids, a phosphor coated anode plate was also used as the anode. The insulating spacer used in this case was a 20 μm thick mica film. Robust phosphor glow was observed during electron emission.

Figure 19:
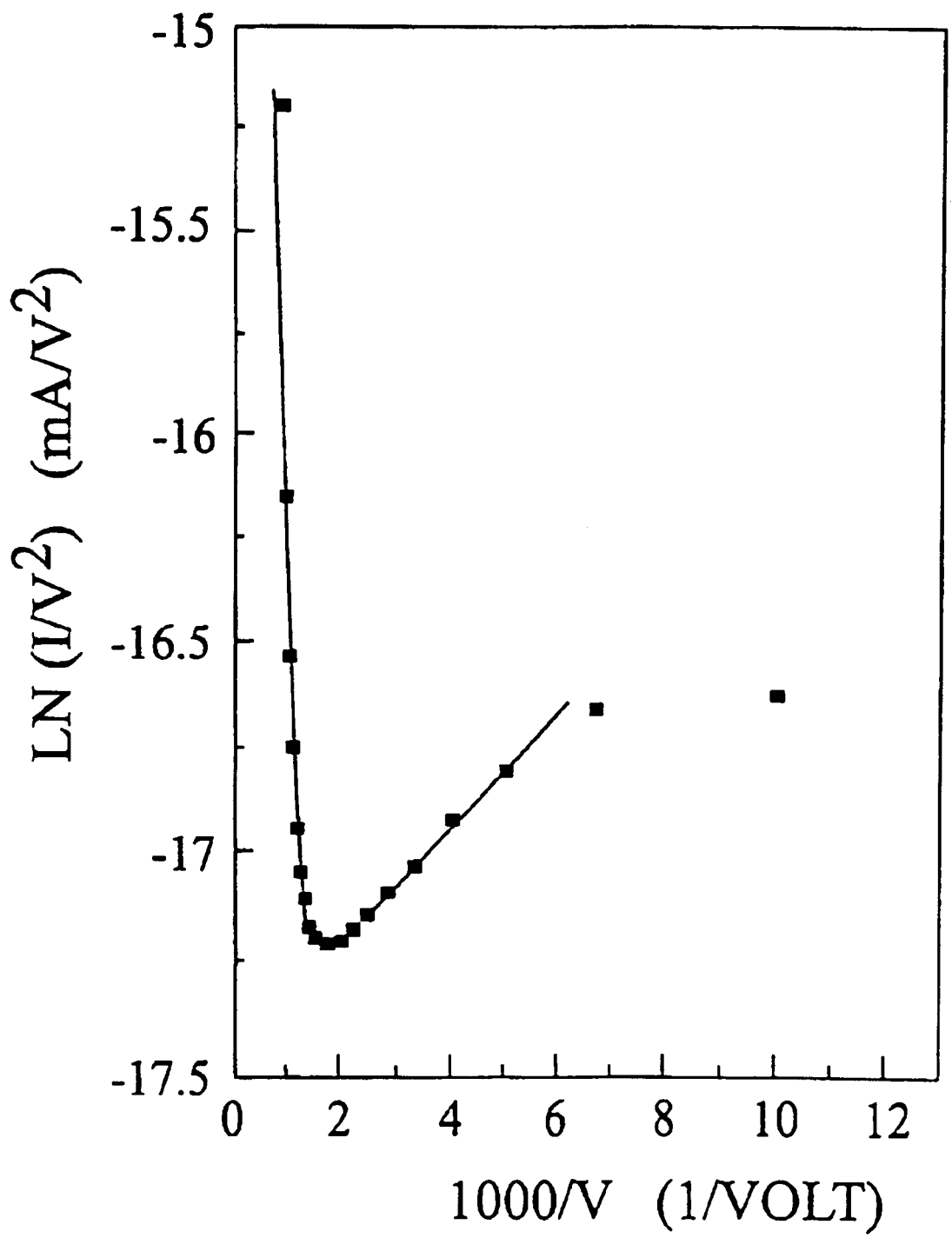
FIG. 19 is a graphical plot of the Fowler-Nordheim (F-N) field emission behavior of the diamond-based pyramid emitter structures of FIG. 12.

The Fowler-Nordheim (F-N) field emission behavior of the diamond microtip emitters 25 of FIG. 12 was analyzed and is shown in FIG. 19. The results indicate significant field emission behavior in two distinct regimes. In the higher electric field regime, the negative slope of the Fowler-Nordheim plot confirms that electron emission is attributed to electron tunneling through a positive work function barrier as described by the F-N equation. At lower electric field, the positive slope of the linear plot is consistent with negative electron affinity behavior. Since vacancy defects in polycrystalline thin film exist (see Z. H. Huang, P. H. Cutler, N. M. Miskovsky, and T. E. Sullivan, "Calculation of Electron Field Emission from Diamond Surface", Proceedings of IVMC, p. 92–95, 1994), the presence of those defects, in significant concentration, could allow the formation of defects states in the bulk band gap. Depending on location of these defects, above or below the vacuum level in the bulk band gap, they could control the electron emission behavior.

Figure 20:
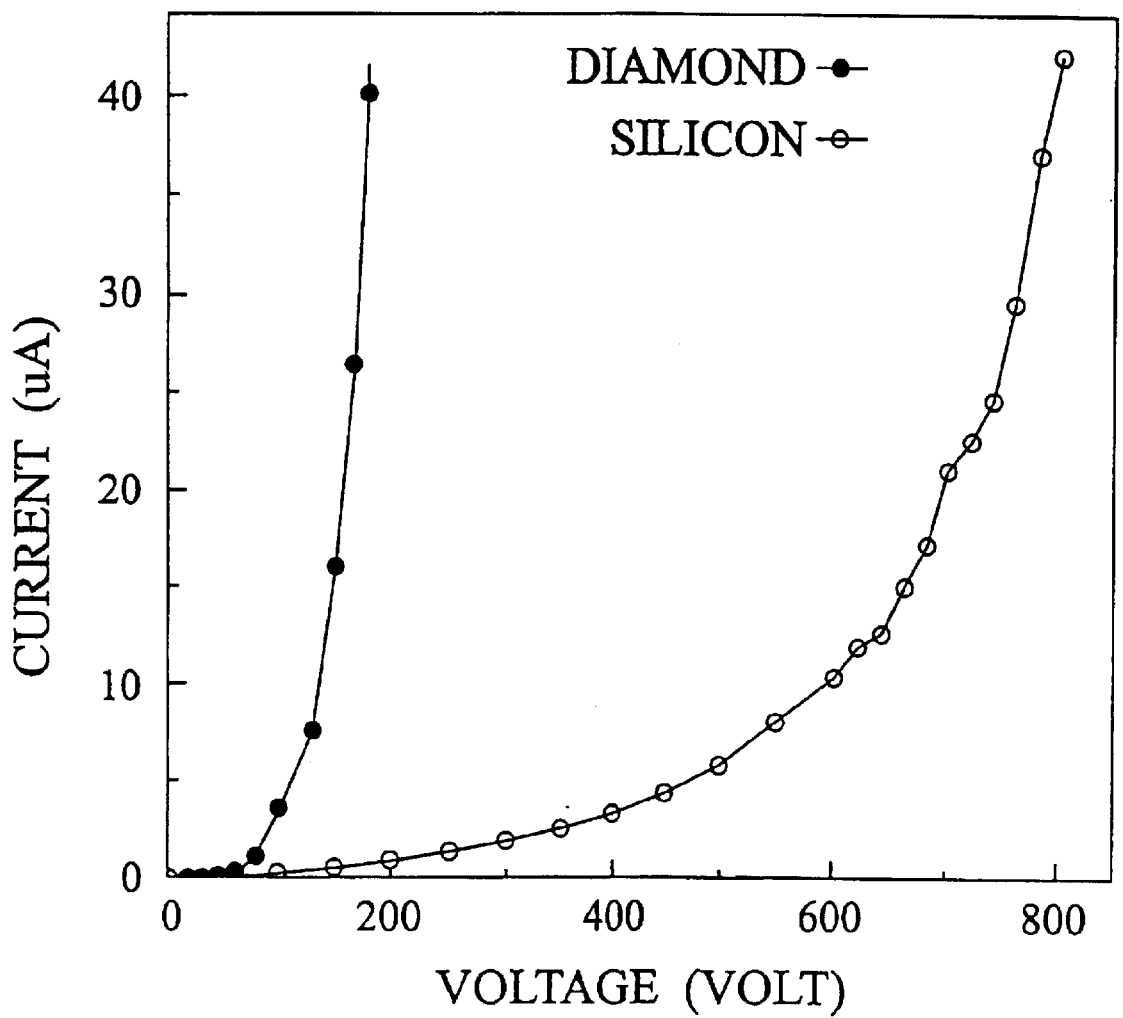
FIG. 20 graphically compares the emission characteristics between diamond microtip emitters and silicon tips of the same type of array structures of FIG. 12.

A comparison of the emission characteristics between diamond emitters and silicon tips of the same type of array structures is shown in FIG. 20. It can be seen that electron field emission for the diamond microtip emitters, in forward bias, exhibits significant enhancement both in total emission current and stability compared to the silicon emitters. The applied electric field for emission is at least 10 to 100 times lower than that required for emission from the best reported values for Si, Ge, GaAs, and metal surfaces.

Figure 13:
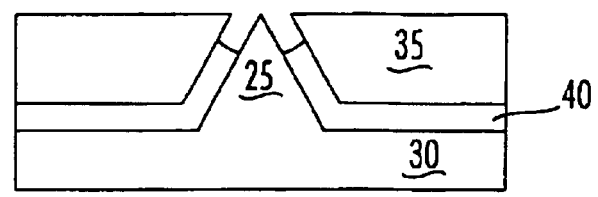
FIG. 13 is a cutaway side view of a second embodiment of a diamond diode device, fabricated to form a doped diamond microtip pyramidal emitter structure, a layer of intrinsic diamond, and a layer of doped diamond.

Another embodiment of a diode device fabricated from the novel diamond microtip emitters of this invention is shown in FIG. 13. The emitter 25 and substrate 30 are made of doped diamond, forming the cathode. The anode 35 is also doped diamond, separated by an insulating layer 40 of intrinsic diamond.

Figure 14:
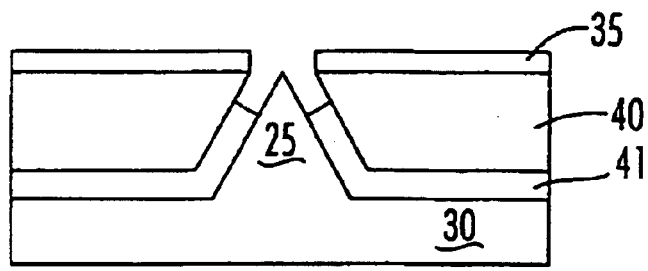
FIG. 14 is a cutaway side view of a third embodiment of a diamond diode device, fabricated to form a diamond microtip pyramidal emitter, a layer of silicon dioxide, an insulating layer of polyimide, and a top metal layer.

FIG. 14 illustrates yet another diode device having a pyramidal diamond microtip emitter 25 and substrate 30 as the cathode. The anode 35 is a metal, separated from the cathode by a first insulating later 41 (silicon dioxide, for example) and a second insulating layer 40, polyamide for example.

Figure 15:
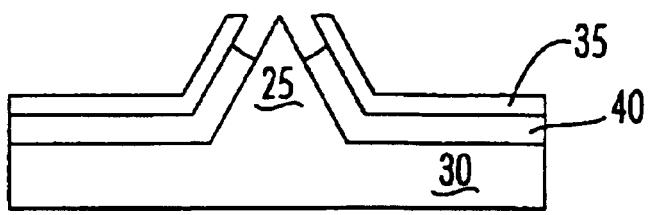
FIG. 15 is a cutaway side view of a fourth embodiment of a diamond diode device, fabricated to form a diamond microtip pyramidal emitter, an insulating layer, and a top metal layer.

FIG. 15 is simplified embodiment of the diode device of FIG. 14 in which there is a diamond emitter 25 and substrate 30 as the cathode, and a metal anode 35 layered over a single insulating layer 40.

Figure 16:
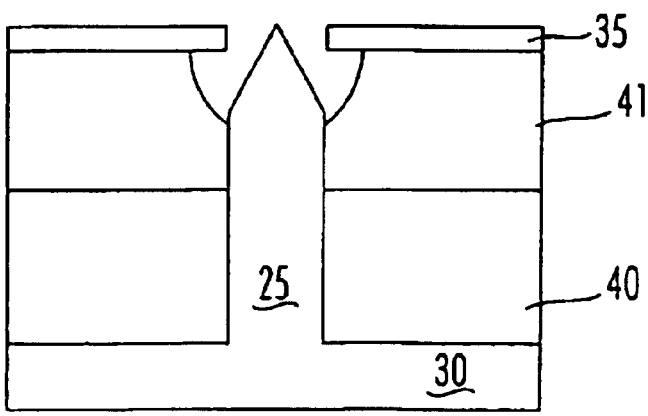
FIG. 16 is a cutaway side view of a fifth embodiment of a diamond diode device, fabricated to form a doped diamond microtip pillar-type emitter structure, an intrinsic diamond layer, a layer of silicon dioxide, and a top layer of doped diamond.

In FIG. 16, the doped diamond emitter 25 of the diode device is a high aspect ratio pillar, on a doped diamond substrate 30, forming the cathode. The doped diamond anode 35 is supported above the emitter 25 by a first insulating later 41 of silicon dioxide and a second insulating layer 40 of intrinsic diamond.

Figure 17:
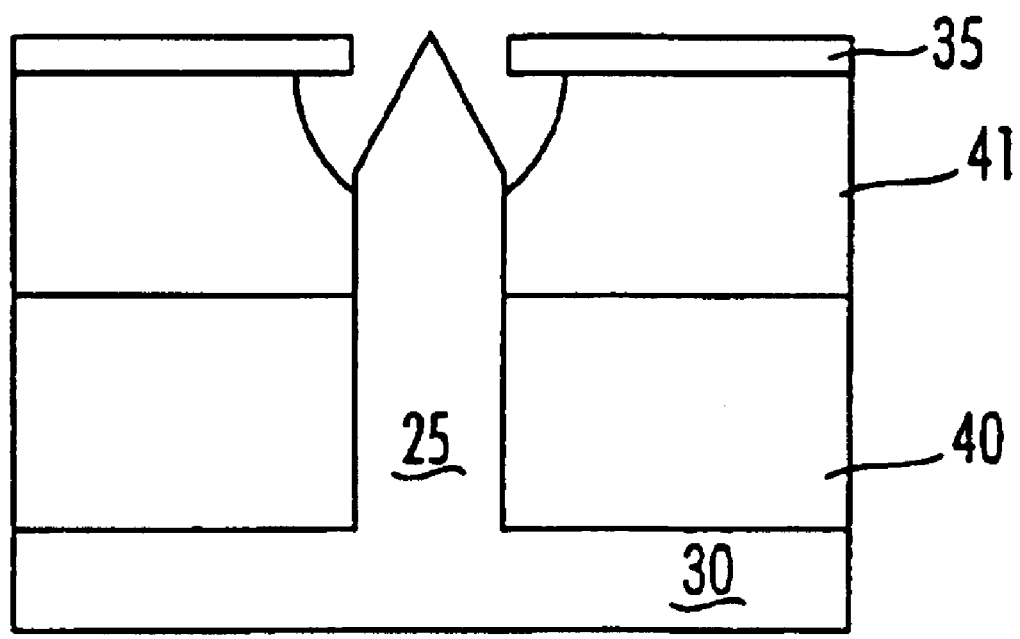
FIG. 17 is a cutaway side view of a sixth embodiment of a diamond diode device, fabricated to form a doped diamond microtip high aspect ratio, pillar-type emitter structure, an insulating, a layer of silicon dioxide, and a top metal layer.

The diode device of FIG. 17 is similar to that of FIG. 16. The anode 35 is metal, supported above the diamond emitter 25 and substrate 30 by a first insulating later 41 (of silicon dioxide, for example) and a second insulating layer 40.

Figure 21:
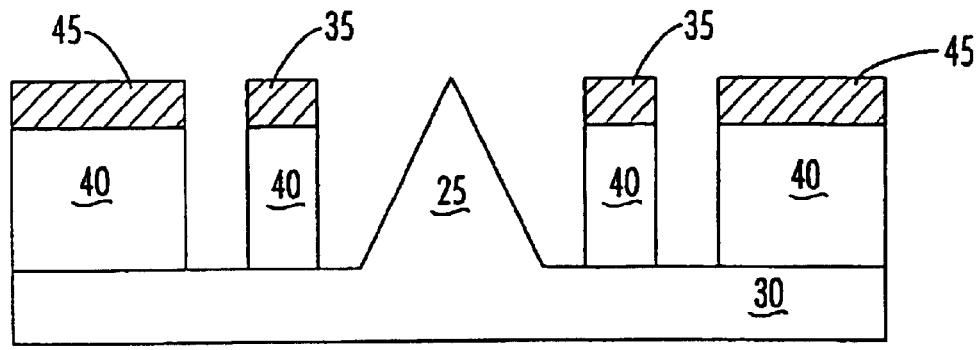
FIG. 21 is a cutaway side view of a first embodiment of a diamond triode device, fabricated from a diamond microtip emitter, and planar gate or anode and grid layers on an insulating layer.
Figure 22:
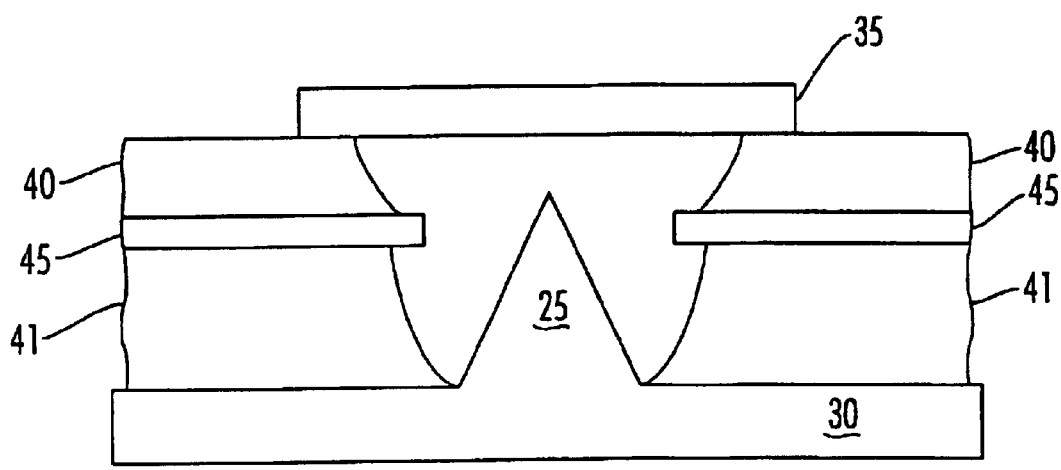
FIG. 22 is a cutaway side view of a second embodiment of a diamond triode device, fabricated from a diamond microtip emitter, a layer of silicon dioxide, a doped diamond grid, a second layer of silicon dioxide, and a doped diamond gate or anode.
Figure 23:
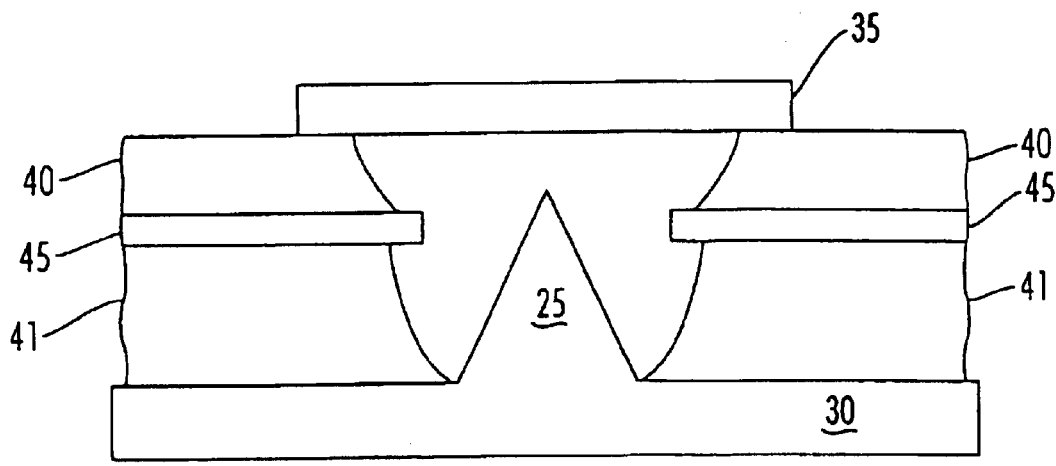
FIG. 23 is a cutaway side view of a third embodiment of a diamond triode device, fabricated from a diamond microtip emitter, an insulating layer, a conducting grid, a second insulating layer, and a metal gate or anode.

FIGS. 21 to 23 illustrate variations of diamond microtip based vacuum triode devices. The triode device of FIG. 21 has a lateral or horizontal architecture, with a pyramidal diamond microtip emitter 25 on a diamond substrate 30. Spaced laterally away from the emitter 25 is the anode 35, supported above the substrate 30 by insulator 40. A grid 45 is spaced further away, supported on substrate 30 by insulator 40. The triode device of FIG. 21 can also be configured where the grid 45 is positioned between the emitter 25 and the anode 35.

In the device of FIG. 22, the grid 45 is supported above the substrate 30 by a first insulating layer 41. The anode 35 is then suspended directly above is the emitter 25 by a second insulating layer 40. The first and second insulating layers 41, 40 can be silicon dioxide. The grid 45 and anode 35 can be doped diamond.

The diamond triode device of FIG. 23 is similar to that of FIG. 22 except that the anode 35 and the grid 45 are metal.

The diamond diode and triode devices of this invention can be fabricated using a process substantially as follows:

The fabrication process is started by growing a 1–1.5 μm oxide masking layer on a p-type <100> silicon wafer as a molding substrate. Conventional photolithography is then used to define the mask layer array. Elements of the array were defined by square pattern oxide windows in the masking layer. To form the inverted pyramidal emitter structures, cavities were anisotropically etched into the molding substrate with an etch-stopped process using potassium hydroxide:normal propanol:deionized water solution. The substrate was then cleaned with acetone and methanol.

CVD diamond was deposited into the cavities and on the surface of the molding substrate by PECVD. The molding substrate material was then etched away.

Figure 44:
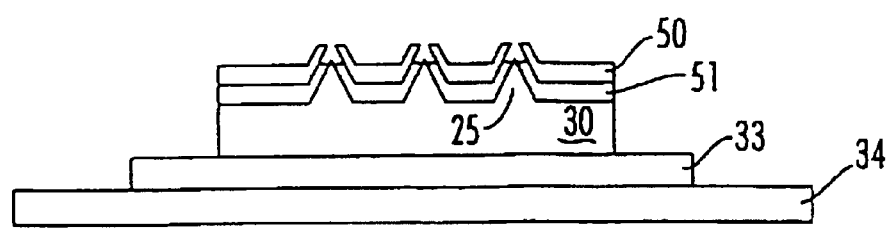
FIG. 44 is a cutaway side view of a gated diamond diode device fabricated in accordance with the methods of the present invention.
Figure 45:
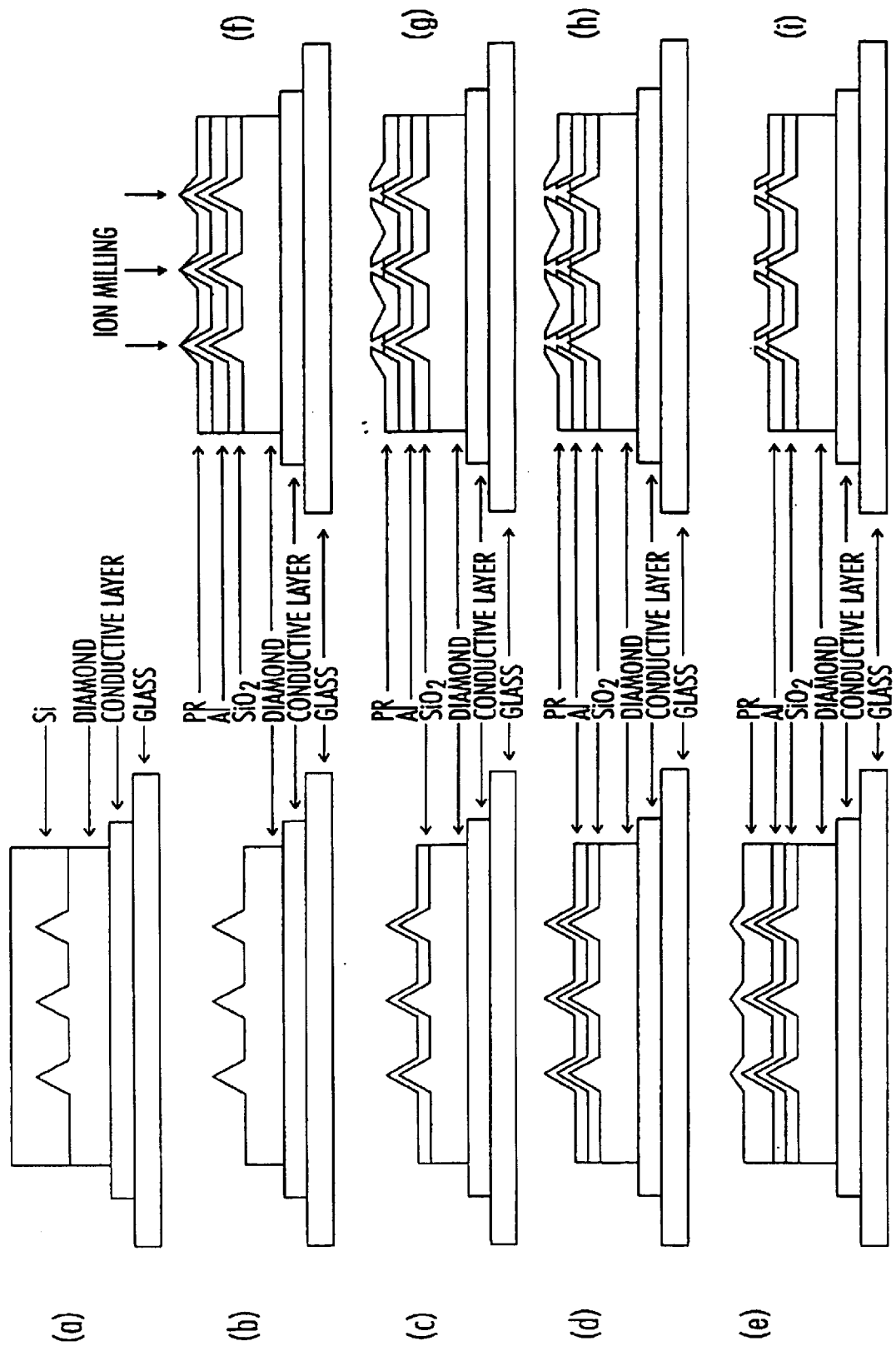
FIG. 45 is a schematic representation of the sequence of steps used to fabricate a self aligning gated diode or triode device, such as that shown in FIG. 44.

In accordance with another novel feature of this invention, additional fabrication steps were performed to construct the self-aligning gated emitter device of FIG. 44. The gated diamond emitter device of FIG. 44 has a conductive gate layer 50 and a gate insulator 51 applied over the array of pyramidal diamond microtip emitters 25 and diamond substrate 30. The substrate 30 is mounted to a conductive layer 33 which, in turn, is attached to a glass substrate 34. The self-aligning fabrication method of this invention is visually summarized in FIG. 45 as a sequence of steps (a) through (i).

In step (a), the array of diamond emitters and integral substrate is attached to a conductive layer, which is in turn bonded to a glass layer. The silicon molding substrate is then etched away in step (b). In step (c), an insulating gate dielectric layer (two micron thick silicon dioxide, for example) is applied over the emitter array and substrate. A conducting gate layer (of one micron thick aluminum or other etchable metal for example) is then applied over the insulating layer in step (d), followed by a layer of photoresist (e.g., an organic polymer) in step (e). The photoresist is applied so that the photoresist layer over the tips of the emitters is not as thick as it is over the regions adjacent to the emitters.

In step (f), the photoresist is partially removed using an ion milling or to other conventional technique that will remove the photoresist over the emitter tips first. Any technique that either uniformly etches the photoresist or that tries to make the photoresist layer flat will work. This produces an intermediate structure as shown in step (g). The metal (aluminum) layer is then exposed to the etch to remove the aluminum over the emitter tip and to partially undercut the photoresist in that region, as shown in step (h). Finally, in step (i), the balance of the photoresist is removed, leaving a device as in FIG. 44 where the gate and emitters are automatically aligned.

Figure 46:
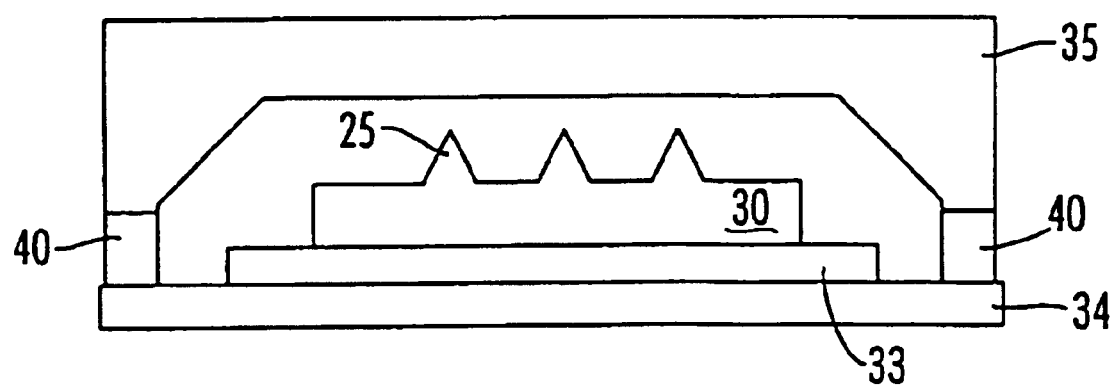
FIG. 46 is a cutaway side view of a cap gated diamond diode device fabricated in accordance with the methods of the present invention.
Figure 47:
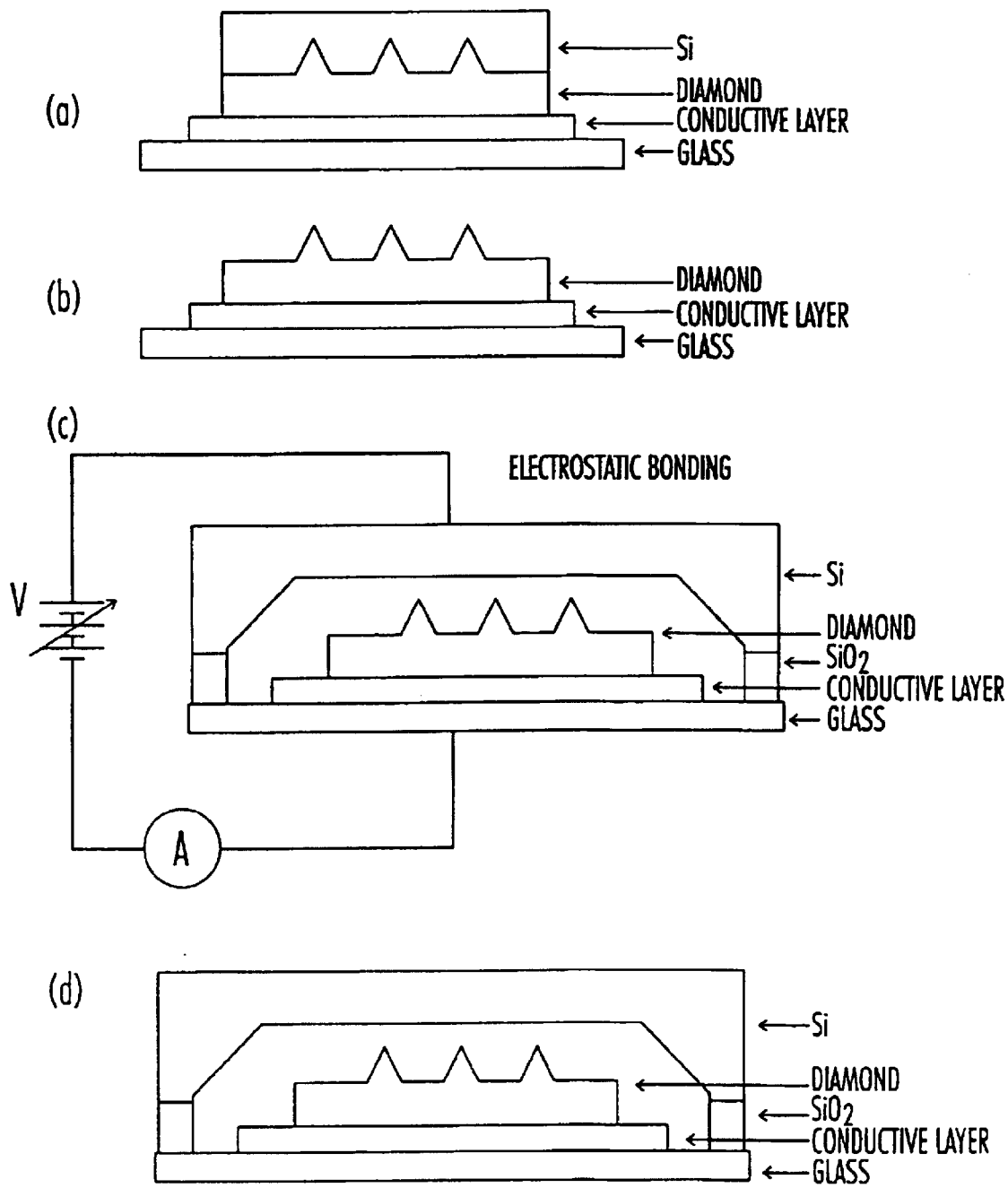
FIG. 47 is a schematic representation of a sequence of steps used to electrostatically bond a cap anode to a gated emitter device of the present invention.

To complete the gated vacuum diode or triode structure, a cap can be applied over the device, as shown in FIG. 46, to function as an anode 35. To construct the cap gated emitter, an anode 35 comprised of heavily doped silicon is electrostatically bonded to the substrate 34 with a dielectric (silicon dioxide, for example) spacer 40 between, forming an emitter-anode spacing of 2 μm. An electrostatic bonding technique that can be used to attach a silicon cap to fabricate the gated diode device of FIG. 46 is shown in FIG. 47 as a sequence of steps (a) through (d). If the cap is bonded in a vacuum, then the gap between the anode and cathode can be sealed to maintain a vacuum.

Figure 34:
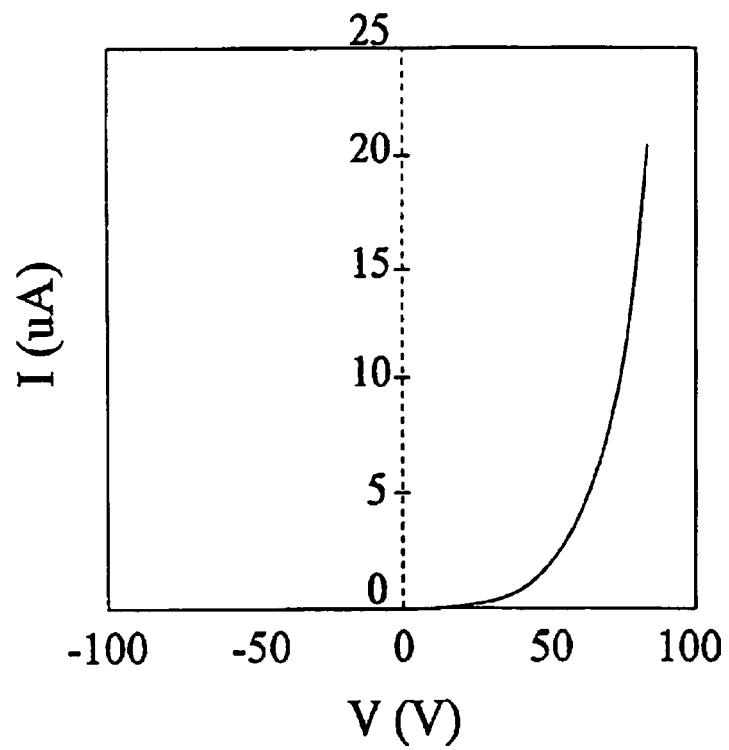
FIG. 34 is a graphic representation of the emission characteristics (emission current vs. gate voltage) in a self-aligned gated emitter device with low carbon graphite content in the diamond microtip emitter.
Figure 35:
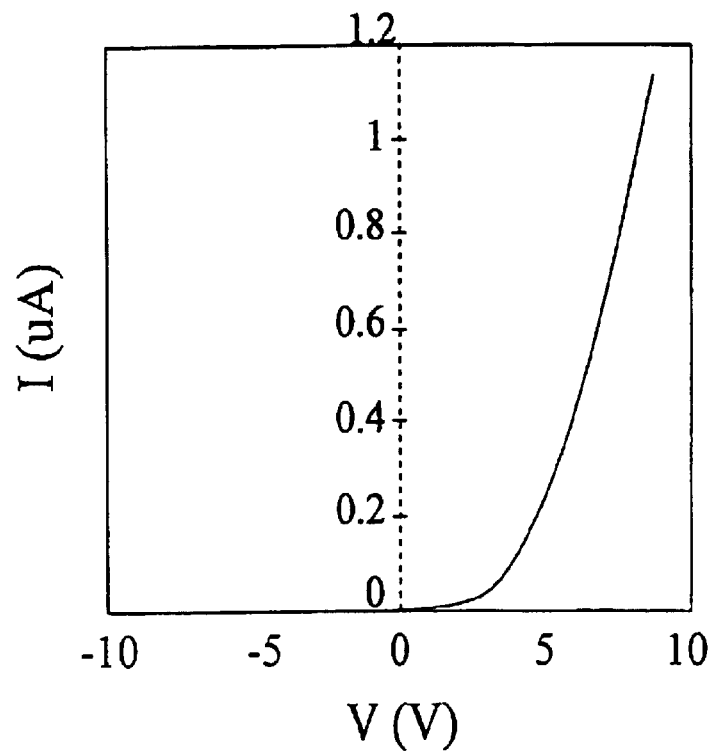
FIG. 35 is a graphic representation of the emission characteristics (emission current vs. gate voltage) in a cap gated device with high carbon graphite content in the diamond microtip emitter.

The emission characteristics of the gated diamond emitters were tested in a vacuum environment of $10^{-6}$ torr. FIG. 34 shows the emission current vs. gate voltage of a self-aligned gated diamond microtip emitter device with low $sp^2$ content, illustrating a low turn-on voltage of 30 V and high emission current of 25 μA The emission current vs. gate voltage of a cap gated to structure with high $sp^2$ content is shown in FIG. 35, illustrating a very low turn-on voltage of 2 V and high emission current of 1 μA. The turn-on voltage is reduced by two orders of magnitude compared to silicon field emitters. The F-N plots cofirm that the gated diamond microtip is a better emitter than silicon. Furthermore, the built-in gated diamond microtip emitters have a stable emission current at a given gate voltage. Current fluctuation is found to be about 1.1% for low emission current and less than 10% for higher emission current. The emission stability is found to be two orders of magnitude more stable than the silicon emitters.

Figure 48:
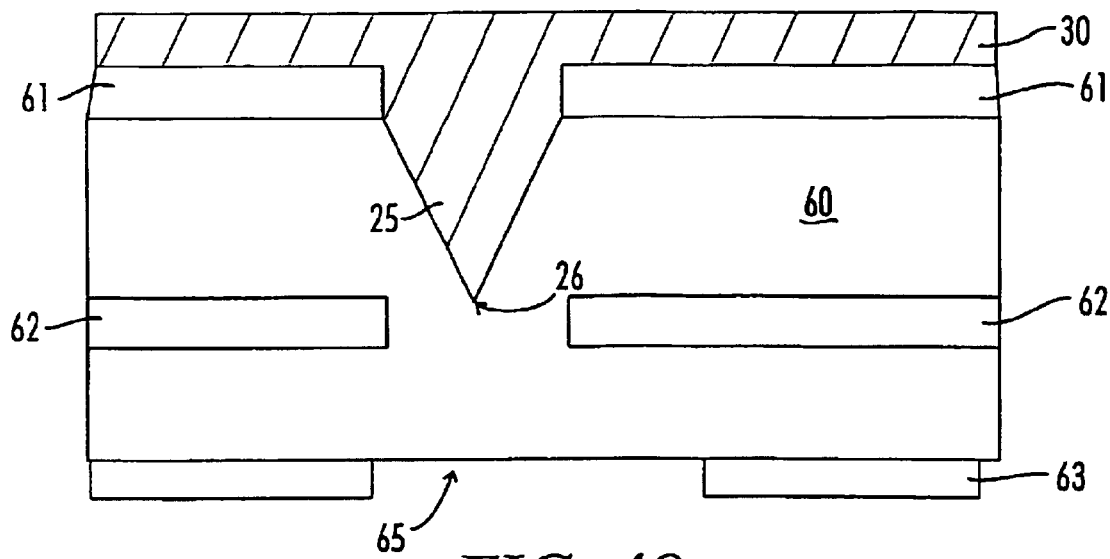
FIG. 48 is a cutaway side view showing the construction of a diamond microtip emitter device fabricated with a buried layer of doped semiconductor as an integral gate structure.
Figure 49:
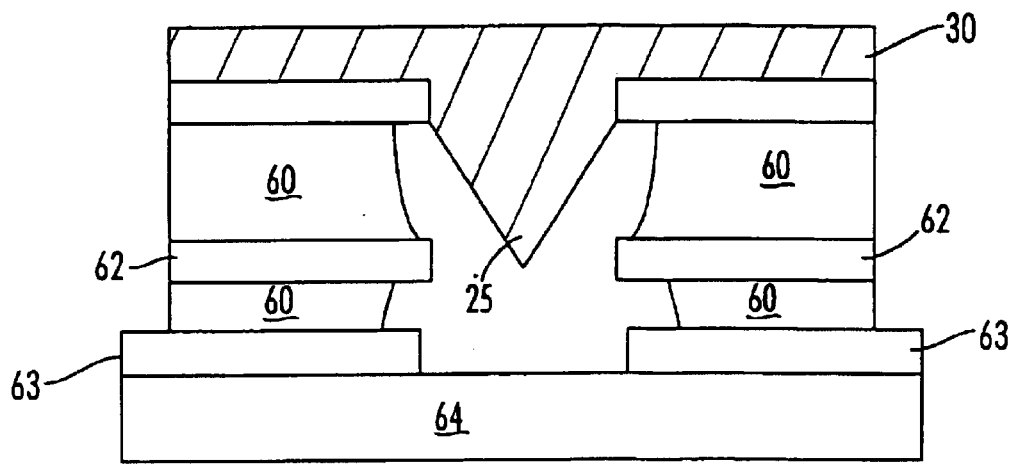
FIG. 49 is a cutaway side view of the device of FIG. 48, further showing a to silicon layer electrostatically bonded to the device.

Another novel aspect of this invention uses silicon integrated circuit technology to produce integrated diamond vacuum microelectronics with one mask and high yield capability. An embodiment of a planar device fabricated in this fashion is shown in FIGS. 48 and 49. In FIG. 48, the CVD diamond microtip emitter 25 is covered by a layer 60 of silicon, with the emitter-side surface of substrate 30 covered by a masking layer 61 of silicon dioxide. A gate structure 62 is formed of a highly doped (p+ or n+) layer of silicon deeply buried in the silicon layer 60. Finally, a second mask layer 63 is applied to the lower surface of the silicon layer 60 and partially etched to leave a window 65 over the emitter 25. The silicon layer 60 is then etched away in proximity to the emitter 25, thereby exposing it. A substrate layer 64 (of silicon, for example) is then electrostatically bonded, as described above, to the masking layer 63 to complete the structure, as seen in FIG. 49. The buried gate structure 62 can now function as a grid.

Figure 50:
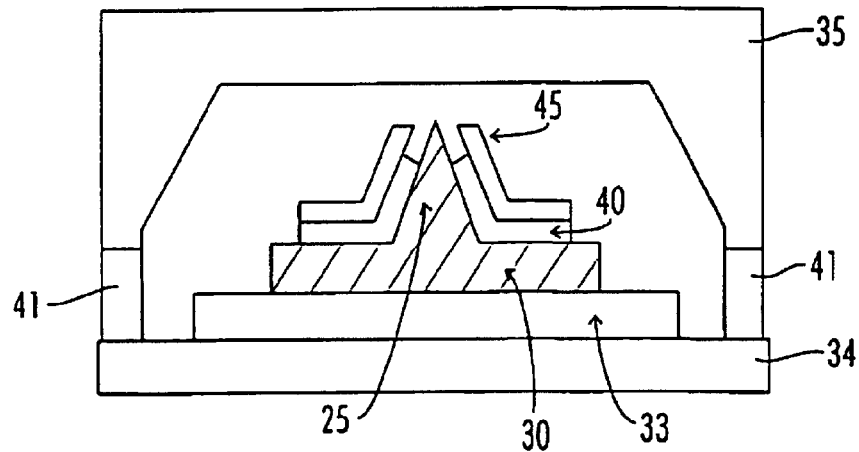
FIG. 50 is a cutaway side view of another embodiment of a diamond triode device fabricated as a fully integrated circuit accordance with this invention.
Figure 51A:
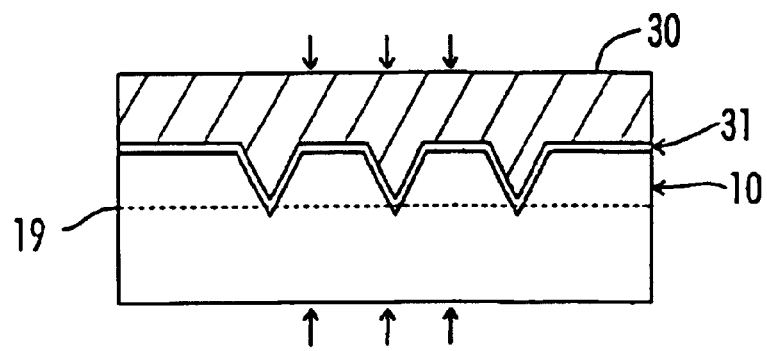
FIGS. 51(a), (b), and (c) are cutaway side views of a diamond triode device shown during and after fabrication as a fully integrated circuit in accordance with the present invention.
Figure 51B:
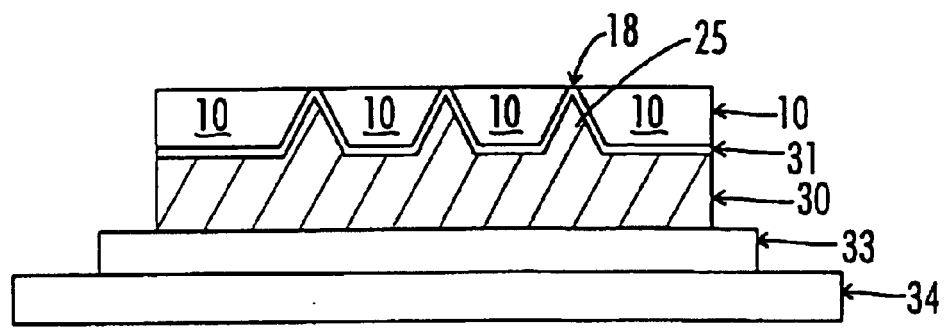
Figure 51C:
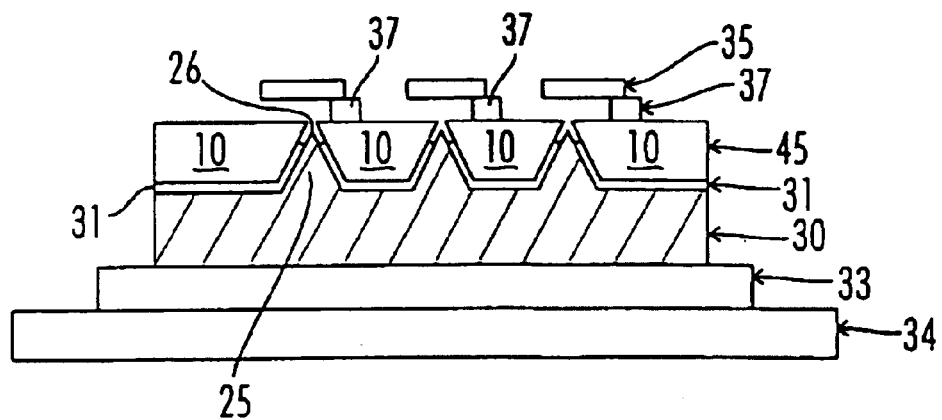

Another novel method of fabricating the diamond microtip diode and triode devices of this invention is illustrated in FIGS. 50–52. FIG. 50 shows a triode device using a single diamond microtip emitter 25 and substrate 30 as the cathode. As discussed above, the substrate 30 will typically be grown integrally with the emitter 25, or a separate substrate can be attached to the bottom surfaces of the emitters 25. An insulating layer 40, silicon dioxide, for example, is applied over the surface of the emitter 25, followed by a metal grid 45. The diamond substrate 30 is attached to a conductive layer 33 which is mounted on a supporting substrate 34, glass, for example. A cap anode 35 is then bonded to supporting substrate 34 through insulating structure 41. Thus, the diamond triode device of FIG. 50 has an integrated grid structure. FIGS. 51a–c show the fabrication of another embodiment of diamond microtip emitter diode and triode devices. In the method as shown, molding substrate 10 is highly doped silicon or other semiconductor so that it can be integrated into the device as the grid or anode, with the emitter or emitter array forming the cathode. Thus, fabrication proceeds in accordance with the following steps:

Cavities are etched into a silicon wafer substrate 10 as described above. A dielectric layer 31 of silicon dioxide, for example, is deposited or grown on the substrate 10. The diamond is then deposited into the cavities and over the top surface of the substrate 10 to form one or more diamond at microtip emitters 25 and an integral diamond substrate 30, as shown on FIG. 50(a). The opposite surface of the substrate 30 is then bonded to a supporting substrate 34 (glass, for example) through a conducting layer 33, as seen on FIG. 51(b). Optionally, the conducting layer 33 can be omitted if the substrate 30 is sufficiently conductive or if some other conventional means of electrically contacting the emitter 25 is provided. A portion of the silicon molding substrate 10 is then removed by etching or lapping and polishing, back to the line 19, until the dielectric (silicon dioxide) layer 31 is exposed at segments 18. The remaining molding substrate 10 is then mechanically and chemically polished. As seen in FIG. 51(b), the device is then turned over, and the remaining "islands" of molding substrate 10 can be utilized as the anode of a diode or as the grid of a triode. As seen in FIG. 51(c), the dielectric layer 31 proximate the emitter tips 26 (segments 18) is etched away to expose the tips 26. To make a triode as seen in FIG. 51(c), an additional oxide layer 37 is deposited on the upper surface of the molding substrate 10, followed by deposition and etching of a metal layer to form anode 35. The remaining "islands" of the molding substrate 10 become the grid 45 of the triode device.

Figure 52A:
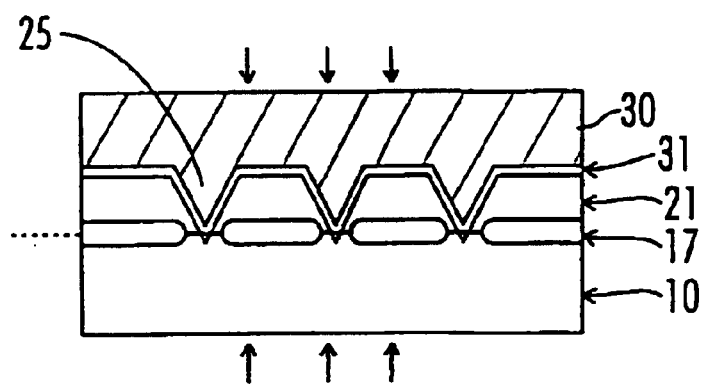
FIGS. 52(a), (b), and (c are cutaway side views of another embodiment of diamond triode device shown during and after fabrication as a fully integrated circuit in accordance with the present invention.
Figure 52B:
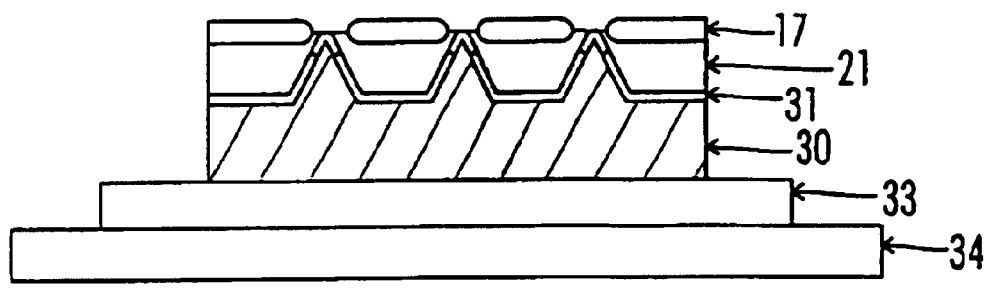
Figure 52C:
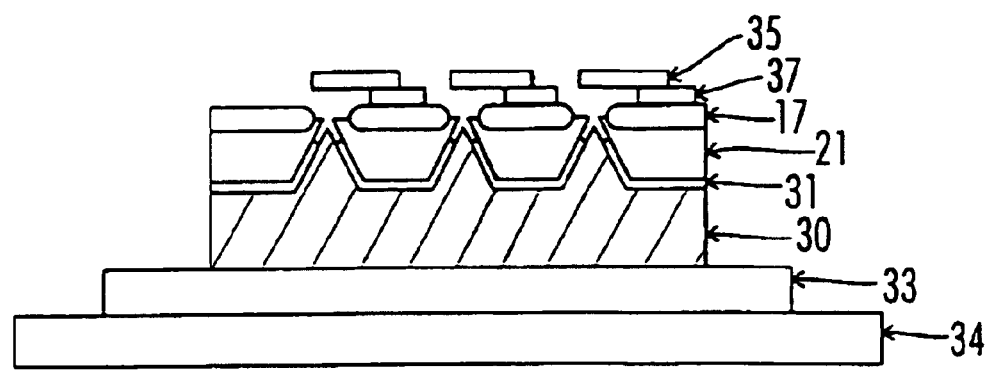

FIGS. 52(a)–(c) illustrate another method of fabricating a diamond vacuum diode or triode device. A masking layer (e.g., an oxide) is applied to a molding substrate 10 made of silicon, for example The mask is used to define a diffusion region within the substrate so that a buried layer 17 of highly doped silicon (FIG. 52(a)) is created in the substrate 10, to function as an integral anode or grid. After diffusion of the buried layer 17, a conventional epitaxy step is performed to grow a single crystal silicon epi layer 21 on a top portion of the molding substrate 10, such that epi layer 21 it becomes an extension of the molding substrate 10. Fabrication then proceeds as described for the device of FIGS. 51(a)–(c), yielding a diode device as seen in FIG. 52(b), with the buried layer 17 functioning as the anode, or a triode device with the buried layer 17 as the grid in the device of FIG. 52(c).

In the illustrations of the diamond diode and triode structures discussed above, the gate, grid, or anode elements are typically shown as ring structures that would encircle the emitters if seen in plan view. However, the same devices can also be fabricated in different architectures, such as using a horseshoe shape around the emitters or having a row of emitters between rows of the other elements on one or both sides.

Diamond Microtip Emitter Based Physical Sensors

The high electron emission efficiency of a diamond based cathode, the low operating voltage, high emission current density and uniformity, and emission stability, are desirable for microsensor applications in both terrestrial and space environments. Advanced novel device structures in vacuum microelectronics using diamond field emitters as electron sources can be utilized in microsensors such as pressure sensors, accelerometers, tactile sensors, and so on.

In this invention, a novel field emission device using an array of well patterned microtip emitters of diamond is employed as a microsensor. Diamond based physical sensor operation in the field emission process is controlled by the Fowler-Nordheim tunneling process. The conduction current density is given by equations 1 and 2 above. Based on the principle described above, the field at the apex of the tip is inversely proportional to the tip radius. Sharp needle tips of diamond-based pyramidal emitter structures are fabricated to enhance high electric field at the apex which yield high emission current. For physical sensor applications, the spacing d between the cathode tip and the anode must be deflection sensitive. This deflection sensitive parameter d can be realized by using a flexible membrane or cantilever beam as the anode or cathode, where a change in force, pressure, inertia, or acceleration can induce a change in the d value and hence in the emission current or device voltage.

Figure 24:
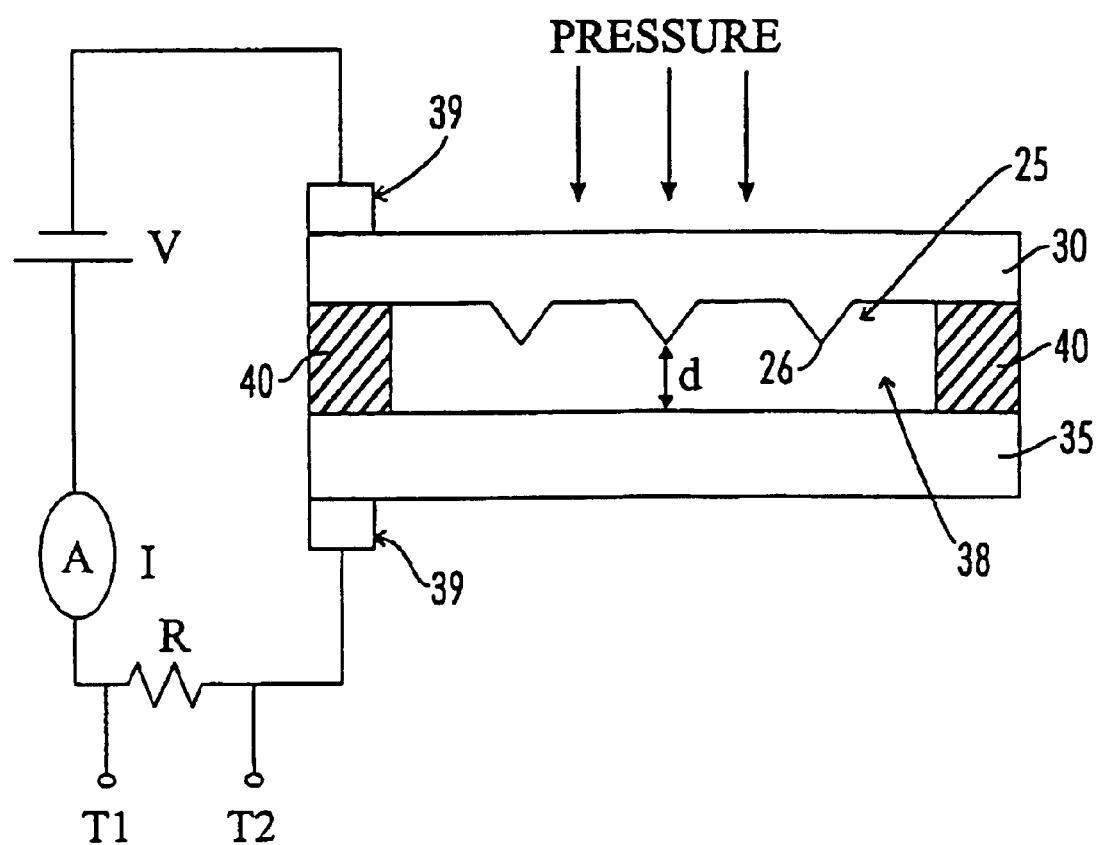
FIG. 24 is a schematic and cutaway representation of a first embodiment of a pressure sensor utilizing a flexible diamond substrate with a pyramidal diamond microtip emitter array (as a cathode), sealed on a silicon substrate (as the anode), to form a vacuum diode structure.
Figure 25:
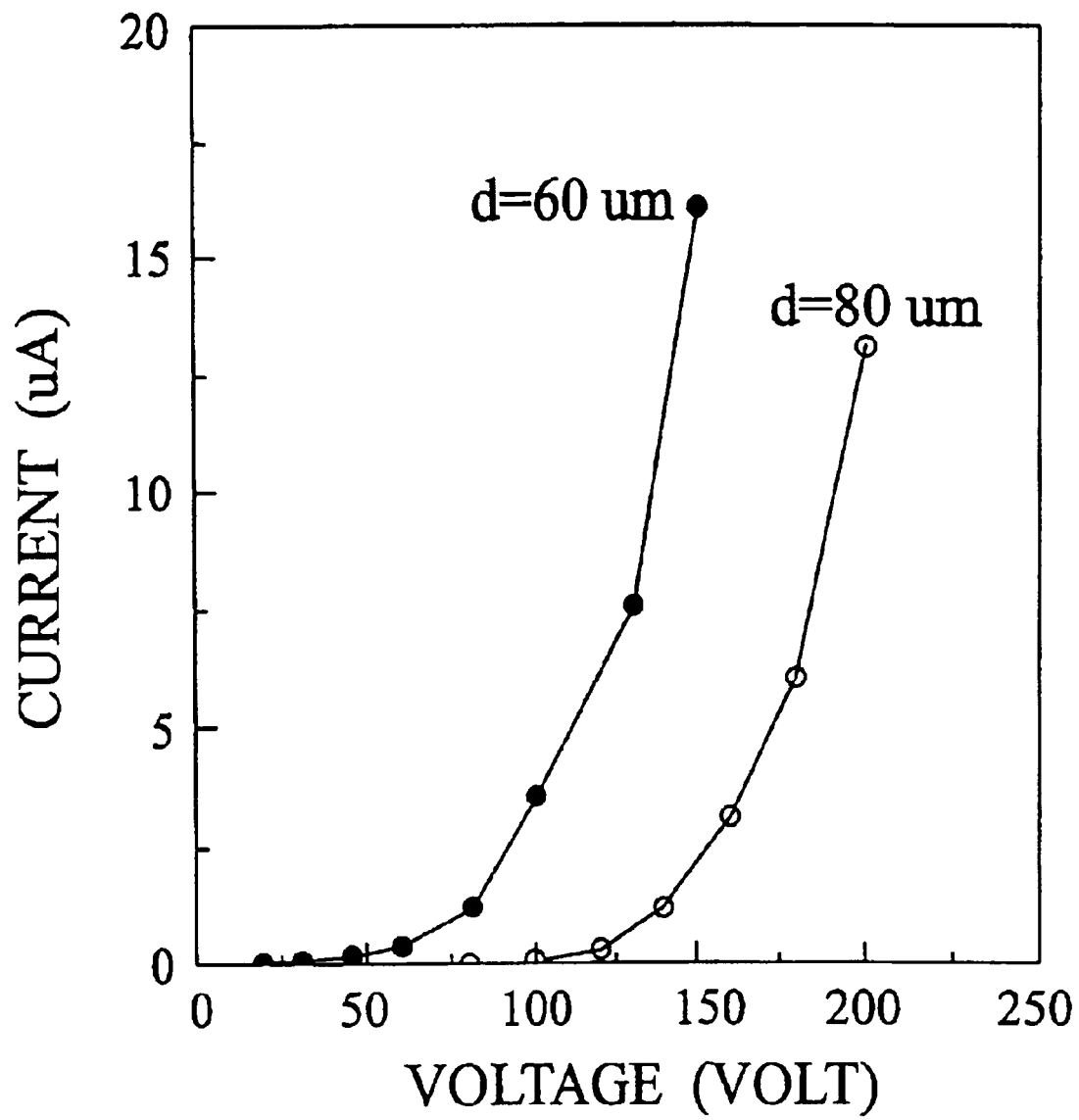
FIG. 25 is a graphical plot of the change in I–V characteristics due to a change in the deflection parameter d for the pressure sensor of FIG. 24.

In conjunction with selective growth of diamond microtips and IC compatible technology, useful diamond emitters and emitter arrays for sensor applications can be achieved. A schematic diagram of a typical pressure sensor structure is shown in FIG. 24. A flexible diamond substrate or diaphragm 30 with an array of pyramidal diamond microtip emitters 25 (as a cathode) is sealed to a silicon substrate, as the anode 35. Insulating spacers 40 support the diamond substrate 30 over the anode 35 to leave an evacuated chamber 38. A voltage V is applied to the device through ohmic contacts 39. Changes in ambient pressure outside the chamber 38 will cause the substrate 30 to deflect, changing the distance d between the emitter tip 26 and the anode 35. This changes the I-V characteristics of the device as shown in FIG. 25. The pressure change can be measured as a voltage change across terminals T1 and T2. This pressure sensor offers high temperature operation, radiation tolerance, small size, good mechanical and thermal properties, electrical stability and compatibility with hostile environments.

Figure 26:
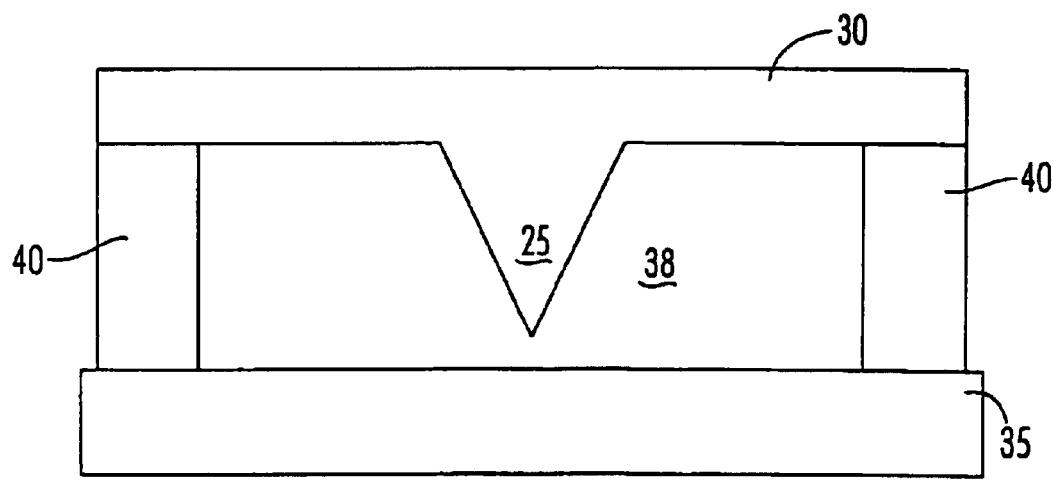
FIG. 26 is cutaway side view of a second embodiment of a diamond diode pressure sensor utilizing a conducting gate or anode, an insulator, and a pyramidal diamond microtip emitter array (as a cathode) on a flexible diamond substrate.

FIG. 26 is a second embodiment of a diamond diode pressure sensor utilizing a conducting gate or anode 35, an insulator 40, and a pyramidal diamond microtip emitter 25 (as a cathode) on a flexible diamond substrate 30.

Figure 27:
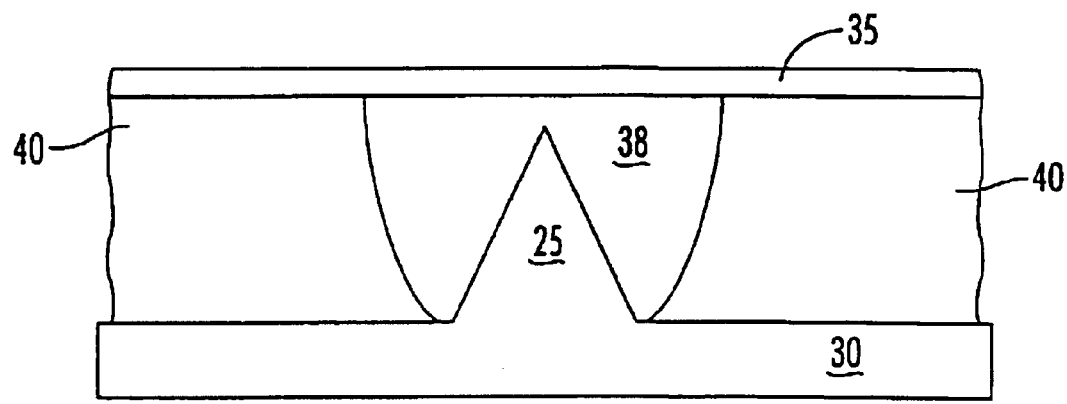
FIG. 27 is cutaway side view of a third embodiment of a diamond diode pressure sensor utilizing a pyramidal diamond microtip emitter, an insulating layer, and a flexible diamond diaphragm as the anode.

FIG. 27 shows a third embodiment of a diamond diode pressure sensor utilizing a pyramidal diamond microtip emitter 25 on a diamond substrate 30, an insulating layer 40, and a flexible diamond diaphragm as the anode 35. In the embodiment of FIG. 27, the anode 35 will move toward or away from the emitter 25 in response to pressure changes outside the chamber 38.

Figure 28:
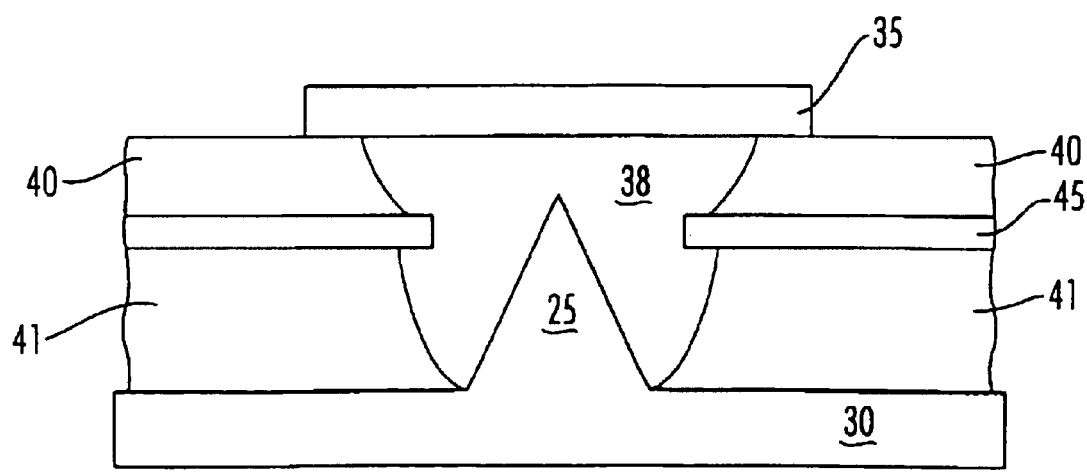
FIG. 28 is cutaway side view of a diamond triode pressure sensor utilizing a pyramidal diamond microtip emitter, an insulating layer, a conducting grid, a second insulating layer, and a flexible diamond membrane diaphragm.

The pressure sensor of FIG. 28 uses a diamond vacuum triode device, having a diamond microtip emitter 25 on a diamond substrate 30, a grid 45 supported above the substrate 30 by a first insulating layer 41, and a flexible diaphragm (diamond, for example) as an anode 35, supported by a second insulating layer 40.

Figure 29:
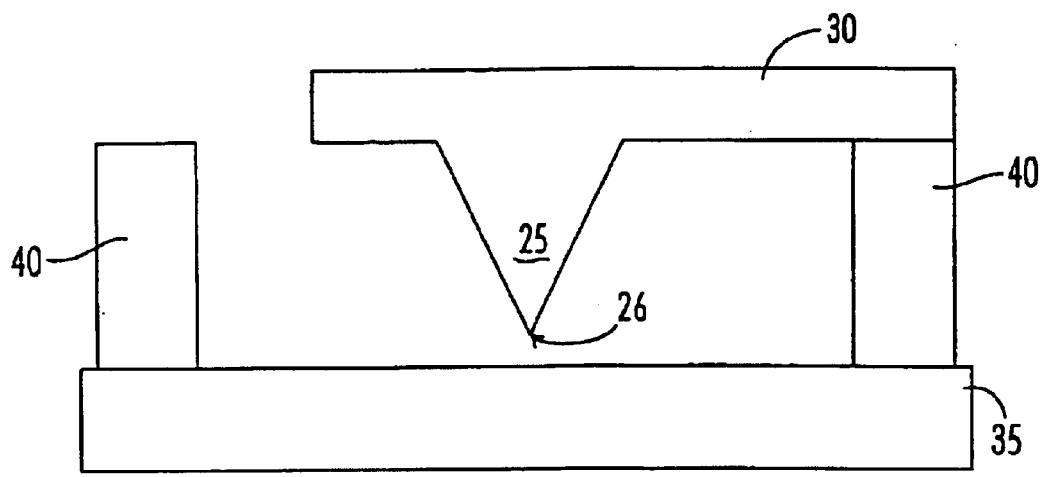
FIG. 29 is a cutaway side view of a first embodiment of a diamond-based accelerometer, having a conducting gate or anode, and a diamond cantilever structure, with a diamond microtip emitter, resting on an insulating layer.

FIG. 29 illustrates an arrangement of a pyramidal diamond microtip emitter 25 as diode accelerometer device. One end of a flexible diamond substrate 30 is suspended in cantilever fashion from an insulator 40 that extends upwardly from an anode 35. If the device is subjected to a change in velocity, the substrate will flex, producing a change in the spacing between the tip 26 of the emitter 25 and the anode 35. If a voltage or current source is applied to the device through ohmic contacts (not shown), this change in spacing will produce a measurable change in electrical output from the device.

Figure 30:
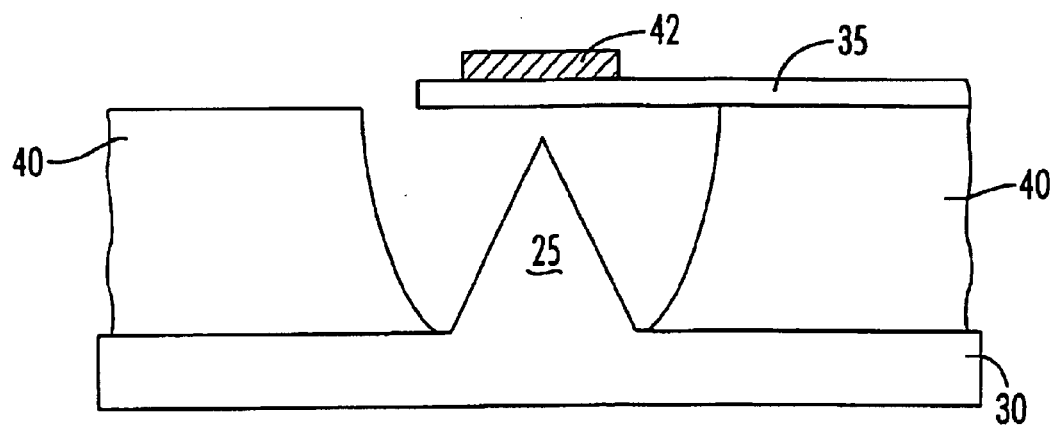
FIG. 30 is a cutaway side view of a second embodiment of a diamond diode accelerometer, having a diamond microtip emitter, and a diamond cantilever structure supporting a mass and resting on an insulating layer.

Another embodiment of a diamond microtip diode structure configured as an accelerometer is shown in FIG. 30. In this embodiment, the anode 35 (diamond, for example) is flexible, with a mass 42 added to enhance movement of the anode 35 toward or away from the emitter 25 in response to a change in velocity.

Figure 31:
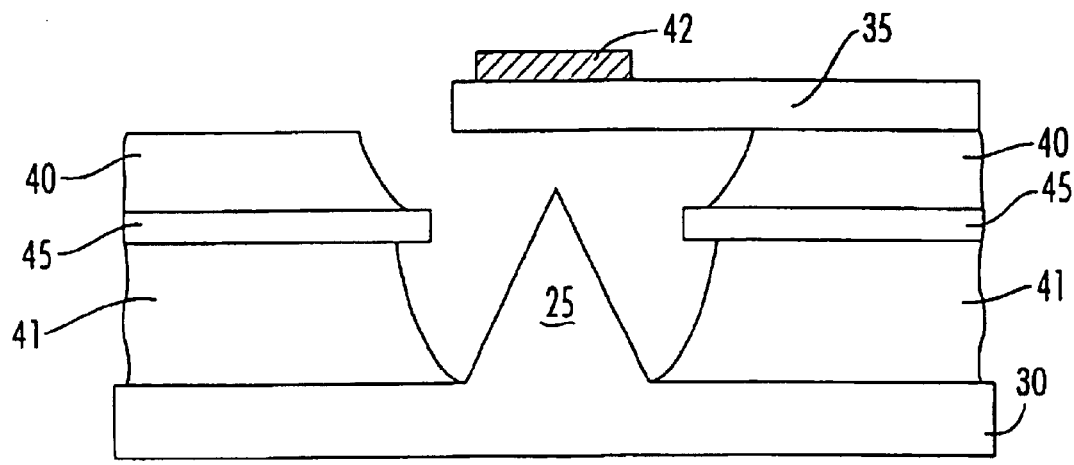
FIG. 31 is a cutaway side view of a diamond triode accelerometer utilizing a pyramidal diamond microtip emitter, an insulating layer, a conducting grid, a second insulating layer, and a diamond cantilever structure supporting a mass.

FIG. 31 is a diamond triode embodiment of the accelerometer of FIG. 30, with a grid 45 supported between the emitter 25, and flexible anode 35 supported by a first insulating layer 41.

Diamond Microtip Emitter Based Chemical Sensors

Figure 32:
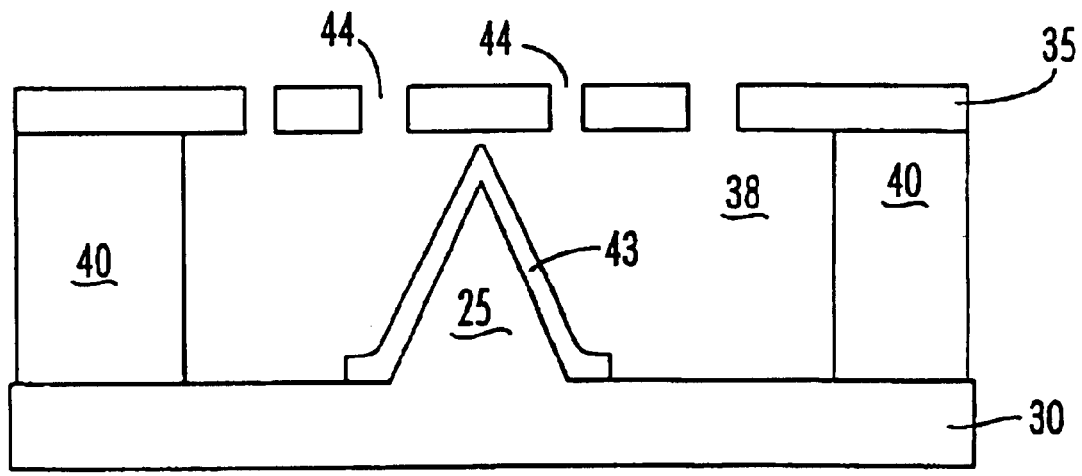
FIG. 32 is a cutaway side view of a first embodiment of a diamond diode chemical sensor utilizing a pyramidal diamond microtip emitter, a catalytic metal coating on the diamond tip, an insulating layer, and a conducting gate or anode.

Novel diamond microtip emitter based chemical sensors which operate in the field emission process can be fabricated by integrating a thin coating of chemical sensitive material 43 on the surface of a pyramidal diamond microtip emitter 25, as shown in the diamond diode chemical sensor of FIG. 32. The chemically sensitive material 43 can be a catalytic metal such as Pt or Pd, and can be thermally evaporated, sputtered or otherwise deposited on the emitter 25. As a target gas or other chemical enters the chamber 38 through windows 44 in anode 35, the emitter will adsorb some of it. A change in work function of the catalytic metal upon adsorption of a chemical species by the catalytic metal coated on the diamond tip will modulate the election emission behavior and hence allow detection of the chemical.

The emission current density of a diamond microtip chemical sensor coated with a catalytic metal is given by:

$$J_a = K_1(E^2/\Phi_a)\exp[-(K_2\Phi_n^{3/2})/E] \text{ in chemical species a (reference) environment}$$

$$J_b = K_1(E^2/\Phi_b)\exp([-(K_2\Phi_b^{3/2})/E] \text{ in chemical species b (detecting) environment}$$

where $K_1$ and $K_2$ are constants, and $\Phi$ is the work function of the emitting surface (in this case the catalytic metal coated on the diamond tip). Therefore, a change in chemical environment will alter the electron emission behavior of the device for chemical sensing.

Figure 33:
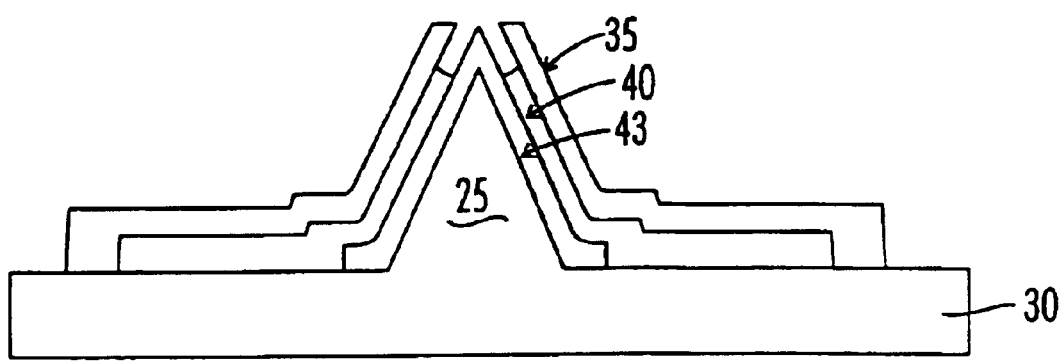
FIG. 33 is a cutaway side view of a second embodiment of a diamond diode chemical sensor utilizing a pyramidal diamond microtip emitter, a catalytic metal coating on the diamond tip, an insulating layer, and a metal gate or anode.

Another embodiment of a chemical sensor in accordance with the present invention is shown in FIG. 33. The chemically sensitive layer 43 (a catalytic metal, for example) is applied over the diamond microtip emitter 25, to followed by an insulating layer 40 and a metal anode 35.

Novel Diamond Microtip Flat Panel Displays

Figure 36:
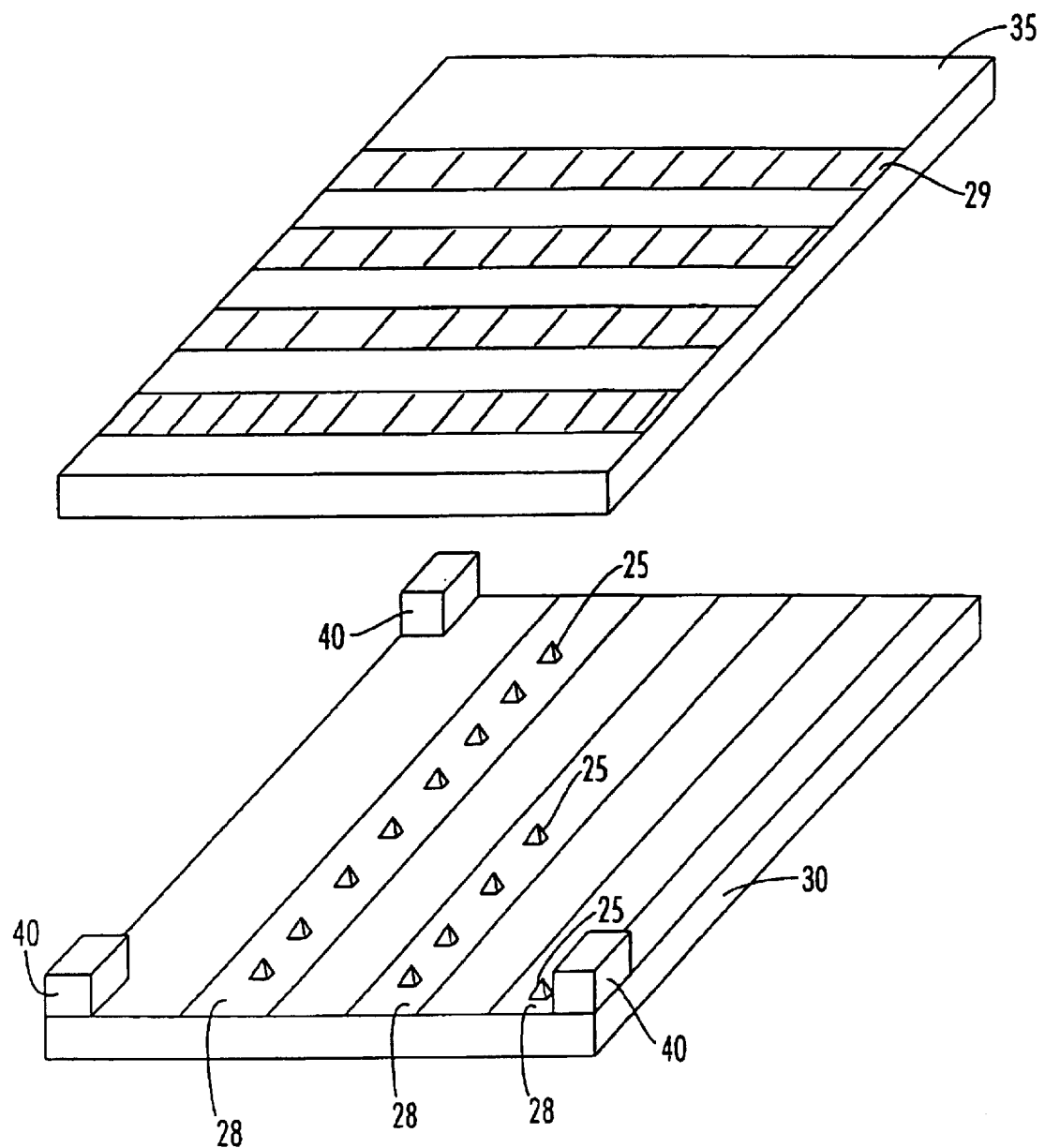
FIG. 36 is an exploded view of a flat panel display fabricated from diode arrays of diamond microtip pyramidal emitters, whereby a phosphorous glass panel is suspended on spacers over a substrate having of columns of emitters.
Figure 37:
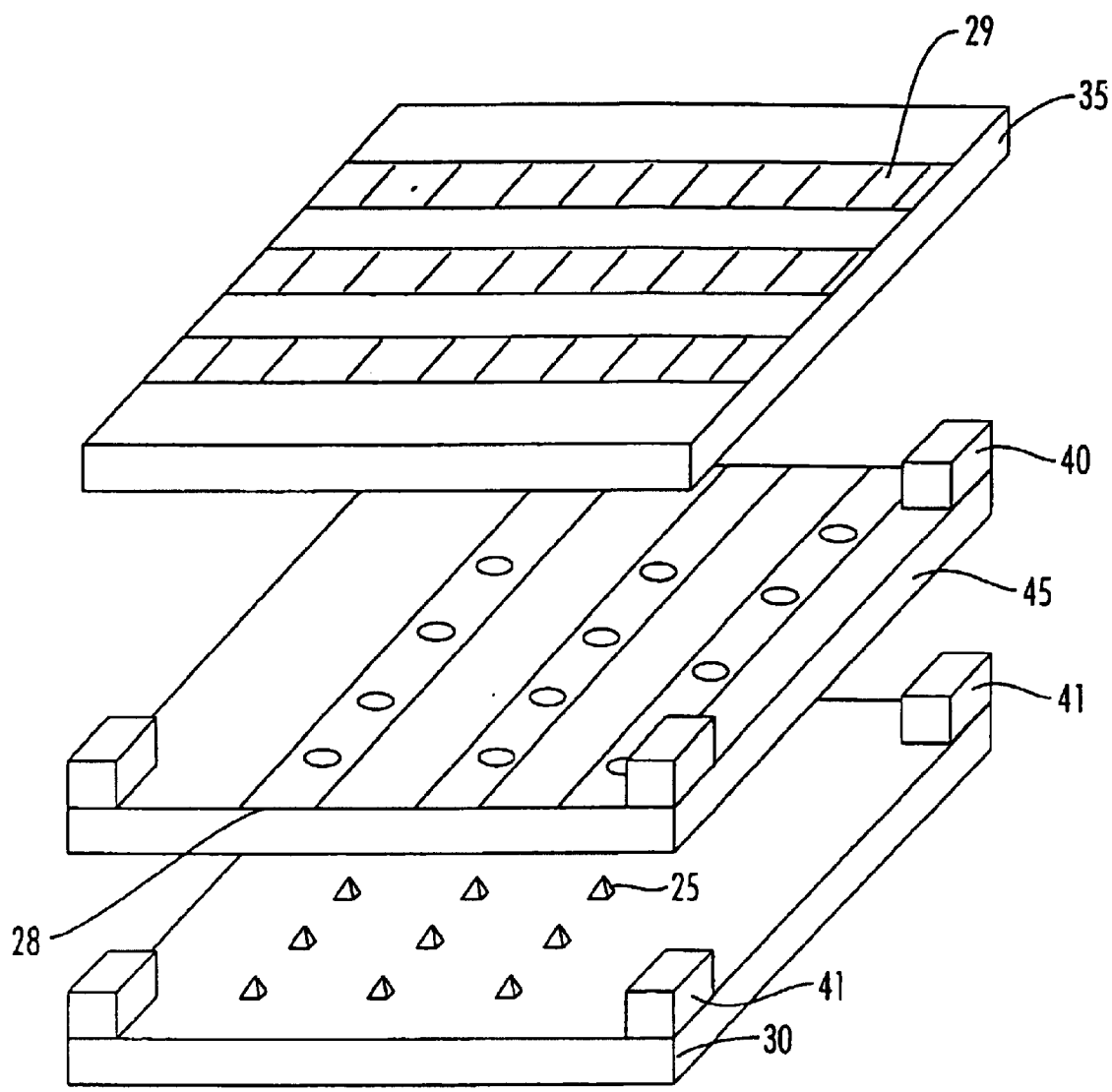
FIG. 37 is an exploded view of a flat panel display fabricated from triode arrays of diamond microtip pyramidal emitters, whereby a phosphorous glass panel is suspended on spacers over a substrate having rows of emitters, with a grid layer interposed between the diamond emitters and the glass screen.

FIGS. 36 and 37 illustrate novel diamond microtip emitter arrays used to create a flat-panel display, using diode or a triode array configurations. In FIG. 36, multiple columns 28 of emitters 25 are arranged on a substrate 30. Each column 28 is electrically isolated and is separately operable by conventional display driver electronics (not shown). Suspended by spacers 40 above the substrate 30 is an anode panel 35 containing multiple rows 29 of phosphor glass that will visibly respond to emission from emitters 35. FIG. 37 shows a similar display arranged in a triode configuration, with a grid panel 45 having columns 28 of emission control elements positioned by spacers 41 between the array of diamond microtip emitters 25 and the anode panel 35.

Thus, although there have been described particular embodiments of the present invention of new and useful microtip vacuum field emitter structures, arrays, and devices, and method of fabrication, it is not intended that such references be construed as limitations upon the scope of this invention except as set forth in the following claims.

Further, although numerous references and examples have been provided to specific materials being used for the various layers of structures and devices, it will be recognized by those skilled in the art that other materials having similar structural and/or electrical properties can be substituted without departing from the scope of this invention as claimed.

What is claimed is:

1. A diamond diode device comprising:
   a. a cathode comprising at least one emitter structure formed monolithically on a diamond substrate, the emitter structure comprising solid diamond and including a diamond microtip emitting portion; and
   b. an anode positioned over and spaced apart from the diamond microtip emitting portion of the cathode;
   c. the cathode fabricated integral to the diamond microtip emitting portion to form a re-usable, integrated diamond diode device.

2. A diamond diode device comprising:
   a. a cathode comprising at least one emitter structure formed on a diamond substrate, the emitter structure comprising solid polycrystalline diamond and including a diamond microtip emitting portion;
   b. an insulating layer formed on the emitter structure and diamond substrate but not covering the diamond microtip emitting portion; and
   c. a first conductive layer formed over the insulating layer but not covering the diamond microtip emitter portion, forming an anode.

3. The diamond diode device of claim 2 wherein the cathode comprises doped diamond, the insulating layer comprises intrinsic diamond, and the first conductive layer comprises doped diamond.

4. The diamond diode device of claim 2 wherein the conductive layer comprises a metal.

5. The diamond diode device of claim 1 wherein the cathode comprises an array of multiple emitter structures.

6. The device of claim 2 further comprising a second conductive layer bonded to a lower surface of the diamond substrate.

7. The device of claim 6 further comprising a glass layer bonded to a lower surface of the second conductive layer.

* * * * *

UNITED STATES PATENT AND TRADEMARK OFFICE
Certificate

Patent No. 6,762,543 B1                                                                   Patented: July 13, 2004

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Weng Poo Kang, Nashville, TN (US); Jimmy Lee Davidson, Brentwood, TN (US); David V. Kerns, Jr., Monteagle, TN (US); and Mickey Evans Howell, Murfreesboro, TN (US).

Signed and Sealed this First Day of July 2014.

NIMESHKUMAR PATEL
*Supervisory Patent Examiner*
Art Unit 2879
Technology Center 2800